United States Patent
Liao et al.

(10) Patent No.: US 8,693,108 B2
(45) Date of Patent: Apr. 8, 2014

(54) IMAGE CAPTURING LENS SYSTEM

(71) Applicant: Largan Precision Co., Ltd., Taichung (TW)

(72) Inventors: Lin-Yao Liao, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 22 days.

(21) Appl. No.: 13/661,317

(22) Filed: Oct. 26, 2012

(65) Prior Publication Data

US 2014/0049837 A1    Feb. 20, 2014

(30) Foreign Application Priority Data

Aug. 15, 2012 (TW) ............................... 101129494 A

(51) Int. Cl.
*G02B 13/18* (2006.01)
(52) U.S. Cl.
USPC .......................................................... 359/714
(58) Field of Classification Search
USPC .......................................................... 359/714
See application file for complete search history.

(56) References Cited

U.S. PATENT DOCUMENTS

| 7,502,181 B2 * | 3/2009 | Shinohara ..................... 359/764 |
| 7,511,895 B2 | 3/2009 | George et al. |
| 8,000,030 B2 | 8/2011 | Tang |

* cited by examiner

*Primary Examiner* — James Jones
(74) *Attorney, Agent, or Firm* — Morris Manning & Martin LLP; Tim Tingkang Xia, Esq.

(57) ABSTRACT

This invention provides an image capturing lens system comprising: a positive first lens element having a convex object-side surface; a negative second lens element having a concave object-side surface and a convex image-side surface; a third lens element with refractive power; a positive fourth lens element having a convex image-side surface, both of the object-side and image-side surfaces being aspheric; a fifth lens element with refractive power having a concave image-side surface, both of the object-side and image-side surfaces being aspheric, at least one inflection point is positioned on the image-side surface thereof. When some particular relations are satisfied, the light-focusing spots of various wavelengths can be favorably adjusted for extending the depth of field; therefore, the present image capturing lens system shall be suitable for compact electronic products with Extended Depth of Field (EDOF) function.

25 Claims, 19 Drawing Sheets

IMAGE CAPTURING LENS SYSTEM

CROSS-REFERENCE TO RELATED APPLICATION

This non-provisional application claims priority under 35 U.S.C. §119(a) on Patent Application No. 101129494 filed in Taiwan (R.O.C.) on Aug. 15, 2012, the entire contents of which are hereby incorporated by reference.

BACKGROUND OF THE INVENTION

1. Field of the Invention

The present invention relates to an image capturing lens system, and more particularly, to a compact image capturing lens system used in electronic products.

2. Description of the Related Art

The demand for compact imaging lens assembly has grown in recent years as the popularity of portable electronic products with the photographing function has increased. The sensor of a general photographing camera is none other than CCD (Charge Coupled Device) or CMOS (Complementary Metal Oxide Semiconductor) sensor. Furthermore, as the advanced semiconductor manufacturing technology has allowed the pixel size of sensors to be reduced, and the current electronic products are leaning toward a trend of being more compact, there is an increasing demand for higher image quality.

The optical system of five lens elements such as the one disclosed in U.S. Pat. No. 8,000,030 is not functioning well in EDOF (Extended Depth of Field), and thereby is not easy to meet the requirement of higher image quality in creating large depth of field through focusing mechanism. In addition, the focusing lens driving devices such as the VCM (voice coil motor) is often employed for the optical system to focus, and this extra cost of the focusing lens driving devices will raise the manufacturing cost; accordingly, it is not favorable for mass production.

Inasmuch as the foregoing, the EDOF changes the conventional optical design thinking by combining the optical technology with the digital technology. The optical information is encoded and further decoded by the computer information technology in order to extend the depth of field for the optical system. Moreover, the auto-focus mechanism without having actual focusing components can obtain a larger depth of field under the premise of not reducing the luminous flux and not affecting the image quality. Therefore, in order to design an optical system which is suitable for compact and portable electronic products, it not only offers better auto-focus performance but also provides higher image quality with lower manufacturing costs. There is a need in this field for an optical system with a suitable convexity for the light focusing adjustment of various wavelengths in order to extend the depth of field and achieve excellent image quality within a proper total track length for image capturing lens system.

SUMMARY OF THE INVENTION

The present invention provides an image capturing lens system comprising, in order from an object side to an image side: a first lens element with positive refractive power having a convex object-side surface; a second lens element with negative refractive power having a concave object-side surface and a convex image-side surface; a third lens element with refractive power; a fourth lens element with positive refractive power having a convex image-side surface, and both of the object-side and image-side surfaces thereof being aspheric; and a fifth lens element with refractive power having a concave image-side surface, both of the object-side and image-side surfaces thereof being aspheric, and at least one inflection point being formed on the image-side surface thereof; wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, an axial distance between the third lens element and the fourth lens element is T34, an axial distance between the fourth lens element and the fifth lens element is T45, an axial distance between the first lens element and the second lens element is T12, and they satisfy the following relations: $-3.0<f/R4<-0.70$; $0.40<f/f4<2.20$; $-2.5<(R1+R2)/(R1-R2)<-0.4$; and $0.75<(T34+T45)/T12<2.95$.

In another aspect, the present invention provides an image capturing lens device with EDOF (Extended Depth of Field) functionality comprising; a digital processing unit with EDOF functionality and an image capturing lens system, wherein the image capturing lens system comprises, in order from an object side to an image side: a first lens element with positive refractive power having a convex object-side surface; a second lens element with negative refractive power having a concave object-side surface and a convex image-side surface; a third lens element with refractive power; a fourth lens element with positive refractive power having a concave object-side surface and a convex image-side surface, and both of the object-side and image-side surfaces thereof being aspheric; and a fifth lens element with negative refractive power having a concave image-side surface, both of the object-side and image-side surfaces thereof being aspheric, and at least one inflection point being formed on the image-side surface thereof; wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, an axial distance between the third lens element and the fourth lens element is T34, an axial distance between the fourth lens element and the fifth lens element is T45, an axial distance between the first lens element and the second lens element is T12, and they satisfy the following relations: $-3.0<f/R4<-0.70$; $0.40<f/f4<2.20$; $-2.5<(R1+R2)/(R1-R2)<-0.4$; and $0.75<(T34+T45)/T12<2.95$.

In still another aspect, the present invention provides an image capturing lens system comprising, in order from an object side to an image side: a first lens element with positive refractive power having a convex object-side surface; a second lens element with negative refractive power having a concave object-side surface and a convex image-side surface; a third lens element with refractive power having a convex image-side surface; a fourth lens element with positive refractive power having a concave object-side surface and a convex image-side surface, and both of the object-side and image-side surfaces thereof being aspheric; and a fifth lens element with negative refractive power having a concave image-side surface, both of the object-side and image-side surfaces thereof being aspheric, and at least one inflection point being formed on the image-side surface thereof; wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, and they satisfy the following relations: −3.0<f/R4<−0.70; 0.20<f/f4<3.0; and −2.5<(R1+R2)/(R1−R2)<−0.4.

In yet another aspect, the present invention provides an image capturing lens device with EDOF (Extended Depth of Field) functionality comprising; a digital processing unit with EDOF functionality and an image capturing lens system, wherein the image capturing lens system comprises, in order from an object side to an image side: a first lens element with positive refractive power having a convex object-side surface; a second lens element with negative refractive power having a concave object-side surface and a convex image-side surface; a third lens element with refractive power having a convex image-side surface; a fourth lens element with positive refractive power having a concave object-side surface and a convex image-side surface, and both of the object-side and image-side surfaces thereof being aspheric; and a fifth lens element with negative refractive power having a concave image-side surface, both of the object-side and image-side surfaces thereof being aspheric, and at least one inflection point being formed on the image-side surface thereof; wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, and they satisfy the following relations: −3.0<f/R4<−0.70; 0.20<f/f4<3.0; and −2.5<(R1+R2)/(R1−R2)<−0.4.

When certain relations are satisfied, the light-focusing spots of various wavelengths can be adjusted in order to extend depth of field favorably which is suitable for the compact electronic products.

In the aforementioned image capturing lens system, the first lens element with positive refractive power provides the main refractive power of the system, and thereby the total track length is reduced. When the second lens element has negative refractive power, the aberration produced by the first lens element with positive refractive power can be effectively corrected. When the third lens element has positive refractive power, the sensitivity of the system can be reduced. When the fourth lens element has positive refractive power, the positive refractive power of the first lens element can be effectively distributed, and thereby the spherical aberration and coma are reduced effectively. When the fourth lens element has positive refractive power and the fifth lens element has negative refractive power, a positive-negative telephoto structure can be consequently obtained, which is favorable for reducing the total track length of the system by shortening the back focal length thereof.

In the aforementioned image capturing lens system, when the first lens element has a convex object-side surface, the distribution of the refractive power of the first lens element can be effectively improved, and thereby the total track length of the image capturing lens system can be further shortened. When the second lens element has a concave object-side surface and a convex image-side surface, the astigmatism of the system can be favorably corrected. When the third lens element has a convex image-side surface, the refractive power of the third lens element can be effectively adjusted for reducing the sensitivity of the system. When the fourth lens element has a convex image-side surface, the positive refractive power of the fourth lens element can be effectively enhanced while reducing the spherical and coma aberrations. When the fourth lens element has a concave object-side surface and a convex image-side surface, the astigmatism of the system can be favorably corrected. When the fifth lens element has a concave image-side surface, the principal point of the system can be positioned away from the image plane, and the back focal length of the system can be reduced for favorably keeping the system compact. Furthermore, when at least one inflection point is formed on the image-side surface of the fifth lens element, the angle of incidence onto the image sensor from the off-axis field can be effectively reduced so that the sensing efficiency of the image sensor can be improved and the off-axis aberration can be corrected.

DETAILED DESCRIPTION OF THE PREFERRED EMBODIMENTS

Figure 1A:
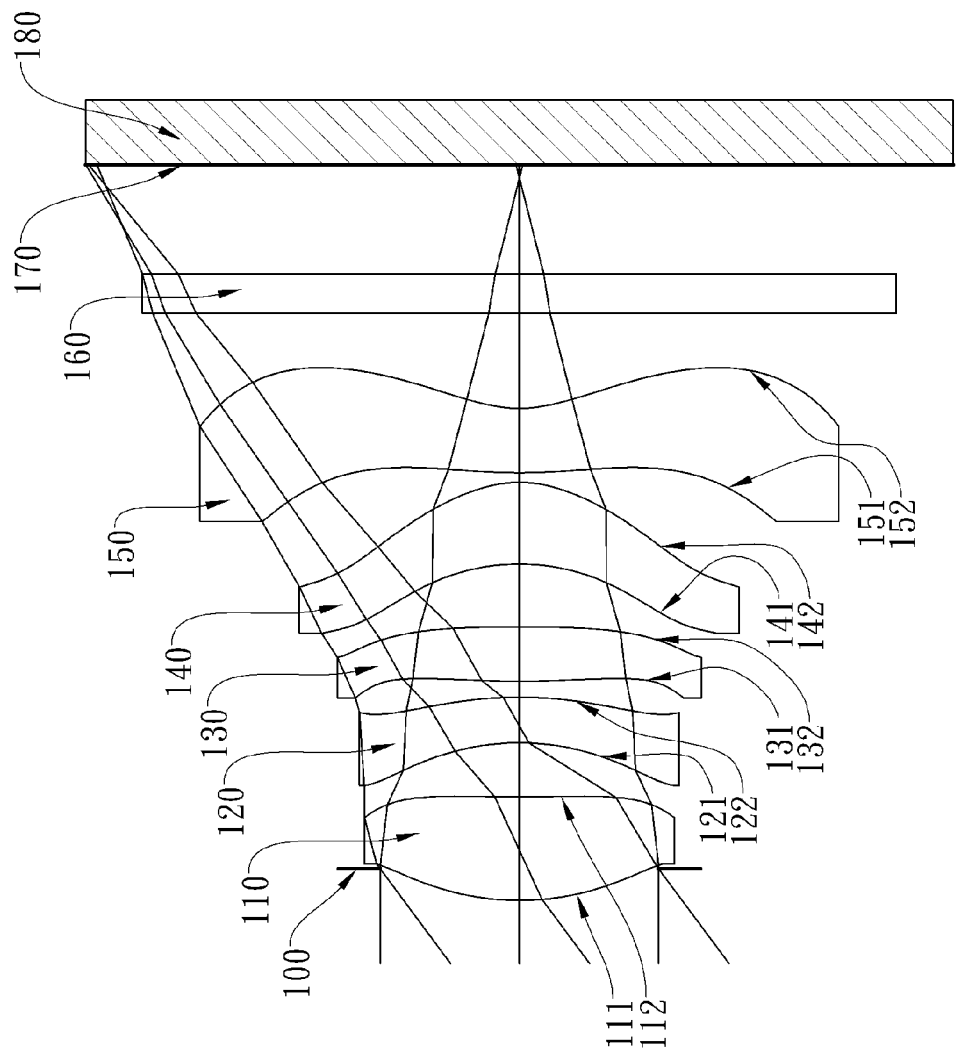
FIG. 1A shows an image capturing lens system in accordance with the first embodiment of the present invention.

The present invention provides an image capturing lens system comprising, in order from an object side to an image side: a first lens element with positive refractive power having a convex object-side surface; a second lens element with negative refractive power having a concave object-side surface and a convex image-side surface; a third lens element with refractive power; a fourth lens element with positive refractive power having a convex image-side surface and both of the object-side and image-side surfaces thereof being aspheric; and a fifth lens element with refractive power having a concave image-side surface, both of the object-side and image-side surfaces thereof being aspheric, and at least one inflection point being formed on the image-side surface thereof; wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, an axial distance between the third lens element and the fourth lens element is T34, an axial distance between the fourth lens element and the fifth lens element is T45, an axial distance between the first lens element and the second lens element is T12, and they satisfy the following relations: $-3.0<f/R4<-0.70$; $0.40<f/f4<2.20$; $-2.5<(R1+R2)/(R1-R2)<-0.4$; and $0.75<(T34+T45)/T12<2.95$.

When the relation of $-3.0<f/R4<-0.70$ is satisfied, the curvature of the image-side surface of the second lens element is more favorable for adjusting the focusing position of lights with various wavelengths to extend depth of the field; preferably, the following relation is satisfied: $-2.5<f/R4<-1.0$.

When the relation of $0.40<f/f4<2.20$ is satisfied, the refractive power of the first lens element can be effectively balanced by the fourth lens element without overloading the positive refractive power, and thereby the spherical aberration and coma are reduced effectively.

When the relation of $-2.5<(R1+R2)/(R1-R2)<-0.4$ is satisfied, the curvature of the first lens element is more suitable and thereby the total track length, spherical aberrations and the astigmatism can be reduced effectively.

When the relation of $0.75<(T34+T45)/T12<2.95$ is satisfied, the interval between each lens element is more favorable for assembling the lens elements and keeping the system compact.

In the aforementioned image capturing lens system, a curvature radius of the image-side surface of the second lens element is R4, a curvature radius of the object-side surface of the second lens element is R3, and they preferably satisfy the following relation: $1.15<R4/R3<3.0$. When the above relation is satisfied, it is favorable for correcting the aberrations generated by the first lens element.

In the aforementioned image capturing lens system, an Abbe number of the second lens element is V2, an Abbe number of the first lens element is V1, and they preferably satisfy the following relation: $0.3<V2/V1<0.5$. When the above relation is satisfied, the chromatic aberration of the system can be effectively corrected.

In the aforementioned image capturing lens system, a focal length of the system is f, a curvature radius of the object-side surface of the second lens element is R3, a curvature radius of the image-side surface of the second lens element is R4, and they preferably satisfy the following relation: $-8<(f/R3)+(f/R4)<-3$. When the above relation is satisfied, it is favorable for adjusting the focusing position of lights with various wavelengths and for correcting the astigmatic aberrations.

In the aforementioned image capturing lens system, a focal length of the image capturing lens system is f, a curvature radius of the image-side surface of the third lens element is R6, and they preferably satisfy the following relation: $-2.0<f/R6<1.0$. When the above relation is satisfied, it is favorable for reducing the sensitivity of the system.

In the aforementioned image capturing lens system, a curvature radius of the object-side surface of the fourth lens element is R7, a curvature radius of the image-side surface of the fourth lens element is R8, and they preferably satisfy the following relation: $0<(R7-R8)/(R7+R8)<0.6$. When the above relation is satisfied, it is favorable for correcting the astigmatic aberrations.

In the aforementioned image capturing lens system, an intersection point between a projected tangent line of the maximum effective diameter position on the object-side surface of the fourth lens element and the optical axis is closer to the object side than the on-axis vertex of the object-side surface of the fourth lens element. When the above relation is satisfied, the curvature of the fourth lens element is not excessively large and the thickness is more proper. This not only facilitates the production and shaping of the lens element but also helps to keep a more compact arrangement of the lens elements, and the off-axis aberrations can be further corrected.

In the aforementioned image capturing lens system, a curvature radius of the image-side surface of the second lens element is R4, and it preferably satisfies the following relation: $-2.0 \text{ mm}^{-1}<1/R4<-0.3 \text{ mm}^{-1}$. When the above relation is satisfied, the curvature of the image-side surface of the second lens element is more proper for extending depth of field for the image capturing lens system.

In the aforementioned image capturing lens system, an axial distance between the object-side surface of the first lens element and the image-side surface of the fifth lens element is TD, a curvature radius of the image-side surface of the second lens element is R4, and it preferably satisfies the following relation: $-8.0 \text{ mm}^2<TD*R4<-2.0 \text{ mm}^2$. When the above relation is satisfied, the curvature of the image-side surface of the second lens element is more proper for extending depth of field for the image capturing lens system and for keeping the system compact.

In another aspect, the present invention provides an image capturing lens device with EDOF (Extended Depth of Field) functionality comprising; a digital processing unit with EDOF functionality and an image capturing lens system, wherein the image capturing lens system comprises, in order from an object side to an image side: a first lens element with positive refractive power having a convex object-side surface; a second lens element with negative refractive power having a concave object-side surface and a convex image-side surface; a third lens element with refractive power; a fourth lens element with positive refractive power having a concave object-side surface and a convex image-side surface, and both of the object-side and image-side surfaces thereof being aspheric; and a fifth lens element with negative refractive power having a concave image-side surface, both of the object-side and image-side surfaces thereof being aspheric, and at least one inflection point being formed on the image-side surface thereof; wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, an axial distance between the third lens element and the fourth lens element is T34, an axial distance between the fourth lens element and the fifth lens element is T45, an axial distance between the first lens element and the second lens element is T12, and they satisfy the following relations: $-3.0<f/R4<-0.70$; $0.40<f/f4<2.20$; $-2.5<(R1+R2)/(R1-R2)<-0.4$; and $0.75<(T34+T45)/T12<2.95$.

EDOF which is short for Extended Depth of Field technology is a camera technique that applies the software algorithm to simulate the hardware with the concept that the RGB components of light will be focused differently under different lens-object distances. When an image is captured under different lens-object distances, each image pixel will be analyzed and selected with the sharpest of the RGB components which leads to the best image results as the main color component, and then the other two RGB components will be calculated and simulated for supplying appropriate coloration in order to extend the depth of field and to both focus the objects of near and far distances.

Referring to U.S. Pat. No. 7,511,895, a digital processing unit with EDOF functionality can be provided along with the present image capturing lens system within an image capturing lens device to achieve an extended depth of field imaging effect and be utilized as a focusing alternative in an imaging system.

When the relation of $-3.0<f/R4<-0.70$ is satisfied, the curvature of the image-side surface of the second lens element is more favorable for adjusting the focusing position of lights with various wavelengths to extend depth of the field.

When the relation of $0.40<f/f4<2.20$ is satisfied, the refractive power of the fourth lens element can be distributed in a more balanced manner; this allows the total track length of the system to be effectively controlled and corrects the high order spherical aberrations, and thereby improving image quality of the system.

When the relation of $-2.5<(R1+R2)/(R1-R2)<-0.4$ is satisfied, the curvature of the first lens element is more suitable and thereby the total track length, the spherical aberrations and astigmatism can be reduced effectively.

When the relation of $0.75<(T34+T45)/T12<2.95$ is satisfied, the interval between each lens element is more favorable for assembling the lens elements and keeping the system compact.

In still another aspect, the present invention provides an image capturing lens system comprising, in order from an object side to an image side: a first lens element with positive refractive power having a convex object-side surface; a second lens element with negative refractive power having a concave object-side surface and a convex image-side surface; a third lens element with refractive power having a convex image-side surface; a fourth lens element with positive refractive power having a concave object-side surface and a convex image-side surface and both of the object-side and image-side surfaces thereof being aspheric; and a fifth lens element with negative refractive power having a concave image-side surface, both of the object-side and image-side surfaces thereof being aspheric, and at least one inflection point being formed on the image-side surface thereof; wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, and they satisfy the following relations: $-3.0<f/R4<-0.70$; $0.20<f/f4<3.0$; and $-2.5<(R1+R2)/(R1-R2)<-0.4$.

When the relation of $-3.0<f/R4<-0.70$ is satisfied, the convexity of the image-side surface of the second lens element is more favorable for adjusting the focusing position of lights with various wavelengths to extend depth of the field; preferably, the following relation is satisfied: $-2.5<f/R4<-1.0$.

When the relation of $0.20<f/f4<3.0$ is satisfied, the refractive power of the fourth lens element can be distributed in a more balanced manner; this allows the total track length of the system to be effectively controlled and corrects the high order spherical aberrations, and thereby improving image quality of the system.

When the relation of $-2.5<(R1+R2)/(R1-R2)<-0.4$ is satisfied, the curvature of the first lens element is more suitable and thereby the total track length, the spherical aberrations and astigmatism can be reduced effectively.

In the aforementioned image capturing lens system, an Abbe number of the second lens element is V2, an Abbe number of the first lens element is V1, and they preferably satisfy the following relation: $0.3<V2/V1<0.5$. When the above relation is satisfied, the chromatic aberration of the system can be effectively corrected.

In the aforementioned image capturing lens system, an axial distance between the object-side surface of the first lens element and the image-side surface of the fifth lens element is TD, a curvature radius of the image-side surface of the second lens element is R4, and it preferably satisfies the following relation: $-8.0 \text{ mm}^2<TD*R4<-2.0 \text{ mm}^2$. When the above relation is satisfied, the curvature of the image-side surface of the second lens element is more proper for extending depth of field for the image capturing lens system and for keeping the system compact.

In the aforementioned image capturing lens system, an intersection point between a projected tangent line of the maximum effective diameter position on the object-side surface of the fourth lens element and the optical axis is closer to the object side than the on-axis vertex of the object-side surface of the fourth lens element. When the above relation is satisfied, the curvature of the fourth lens element is not excessively large and the thickness is more proper. This not only facilitates the production and shaping of the lens element but also helps to keep a more compact arrangement of the lens elements, and the off-axis aberrations can be further corrected.

In the aforementioned image capturing lens system, an axial distance between the third lens element and the fourth lens element is T34, an axial distance between the fourth lens element and the fifth lens element is T45, an axial distance between the first lens element and the second lens element is T12; preferably, when the relation of $0.75<(T34+T45)/T12<2.95$ is satisfied, the interval between each lens element is more favorable for assembling the lens elements and keeping the system compact.

In the aforementioned image capturing lens system, an axial distance between the object-side surface of the first lens element and the image plane is TTL, a maximum image height of the image capturing lens system (half of a diagonal length of an effective photosensitive area of the image sensor) is ImgH, and they preferably satisfy the following relation: $TTL/ImgH<1.80$. When the above relation is satisfied, it is favorable for keeping the system compact for portable electronic products.

In yet another aspect, the present invention provides an image capturing lens device with EDOF (Extended Depth of Field) functionality comprising; a digital processing unit with EDOF functionality and an image capturing lens system, wherein the image capturing lens system comprises, in order from an object side to an image side: a first lens element with positive refractive power having a convex object-side surface; a second lens element with negative refractive power having a concave object-side surface and a convex image-side surface; a third lens element with refractive power having a convex image-side surface; a fourth lens element with positive refractive power having a concave object-side surface and a convex image-side surface, and both of the object-side and image-side surfaces thereof being aspheric; and a fifth lens element with negative refractive power having a concave image-side surface, both of the object-side and image-side surfaces thereof being aspheric, and at least one inflection point being formed on the image-side surface thereof; wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, and they satisfy the following relations: $-3.0<f/R4<-0.70$; $0.20<f/f4<3.0$; and $-2.5<(R1+R2)/(R1-R2)<-0.4$.

When the relation of $-3.0<f/R4<-0.70$ is satisfied, the convexity of the image-side surface of the second lens element is more favorable for adjusting the focusing position of lights with various wavelengths to extend depth of the field.

When the relation of $0.20<f/f4<3.0$ is satisfied, the refractive power of the fourth lens element can be distributed in a more balanced manner; this allows the total track length of the system to be effectively controlled and corrects the high order aberrations, and thereby improving image quality of the system.

When the relation of $-2.5<(R1+R2)/(R1-R2)<-0.4$ is satisfied, the curvature of the first lens element is more suitable and thereby the total track length, the spherical aberrations and astigmatism can be reduced effectively.

In the aforementioned image capturing lens system, a curvature radius of the image-side surface of the second lens element is R4, a curvature radius of the object-side surface of the second lens element is R3, and they preferably satisfy the following relation: $1.15<R4/R3<3.0$. When the above relation is satisfied, it is favorable for correcting the aberrations generated by the first lens element.

In the aforementioned image capturing lens system, a focal length of the system is f, a curvature radius of the object-side surface of the second lens element is R3, a curvature radius of the image-side surface of the second lens element is R4, and they preferably satisfy the following relation: $-8<(f/R3)+(f/R4)<-3$. When the above relation is satisfied, it is favorable for adjusting the focusing position of lights with various wavelengths and for correcting the astigmatic aberrations.

In the aforementioned image capturing lens system, the lens elements can be made of glass or plastic materials. If the lens elements are made of glass, the freedom for distributing the refractive power of the image capturing lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the image capturing lens system can be effectively reduced.

In the present image capturing lens system, there can be at least one stop provided, such as an aperture stop, a glare stop or a field stop. Said glare stop or said field stop is for eliminating the stray light and thereby improving the image resolution thereof.

In the present image capturing lens system, an aperture stop can be configured as a front stop or a middle stop. A front stop can provide a longer distance between an exit pupil of the system and an image plane and which improves the image-sensing efficiency of an image sensor. A middle stop is favorable for enlarging the field of view of the system and thereby provides a wider field of view for the same.

In the present image capturing lens system, if a lens element is described to have a convex surface, it means the portion of the surface in proximity to the optical axis is convex; if a lens element is described to have a concave surface, it means the portion of the surface in proximity to the optical axis is concave.

Figure 10:
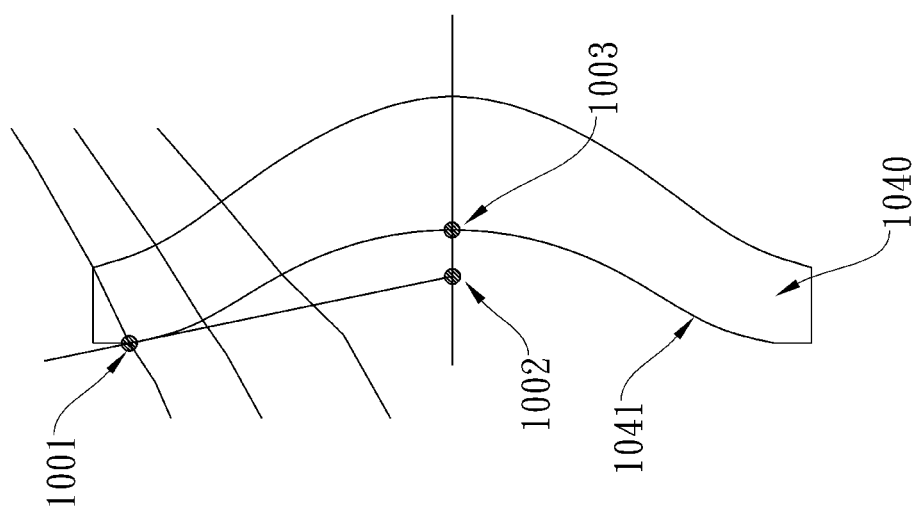
FIG. 10 shows the features of the object-side surface of the fourth lens element.

In FIG. 10, an intersection point 1002 between a projected tangent line of the maximum effective diameter position 1001 on the object-side surface 1041 of the fourth lens element 1040 and the optical axis is closer to the object side than the on-axis vertex 1003 of the object-side surface 1041 of the fourth lens element 1040.

Preferred embodiments of the present invention will be described in the following paragraphs by referring to the accompanying drawings.

Embodiment 1

Figure 1B:
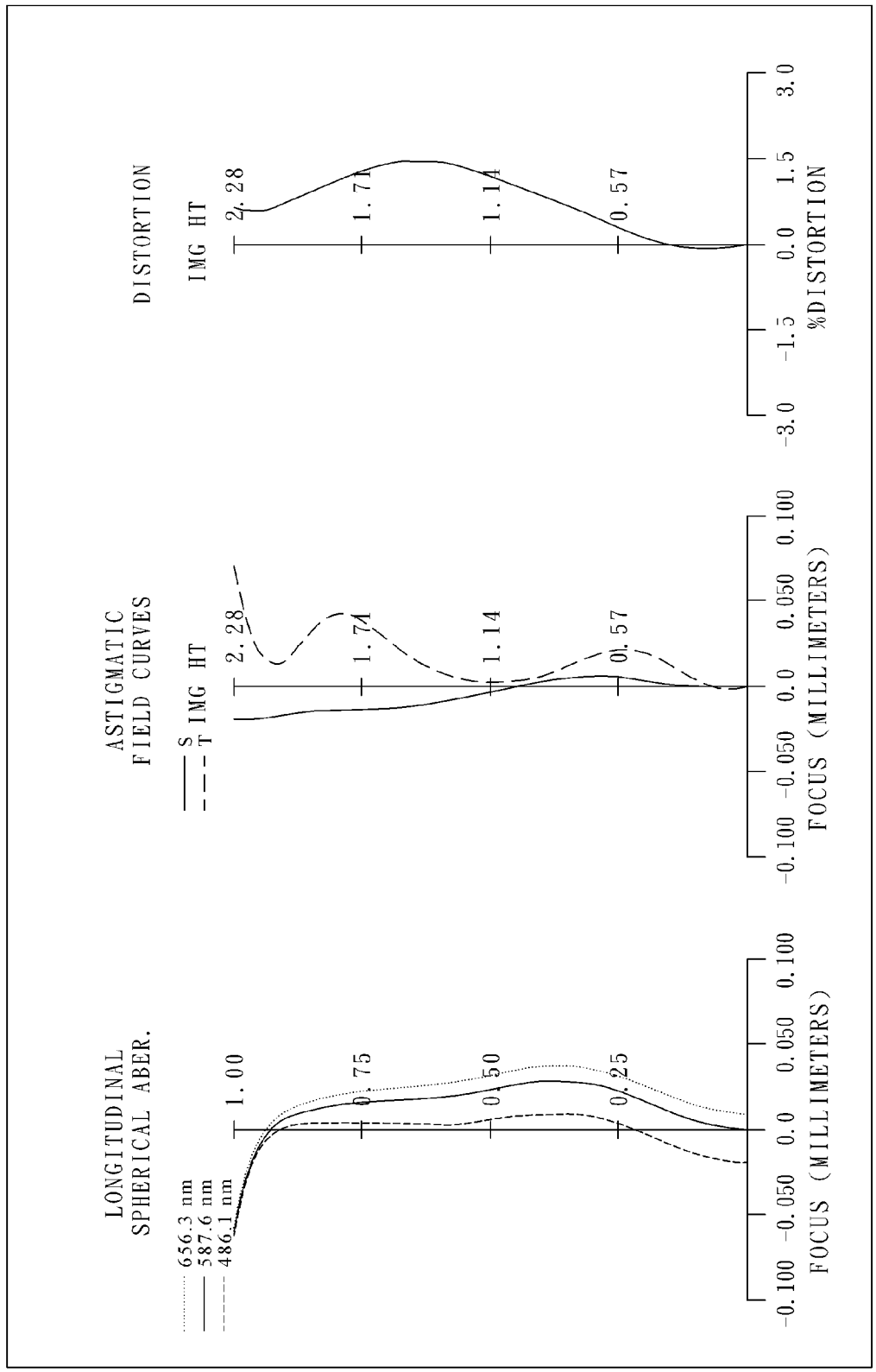
FIG. 1B shows the aberration curves of the first embodiment of the present invention.

FIG. 1A shows an image capturing lens system in accordance with the first embodiment of the present invention, and FIG. 1B shows the aberration curves of the first embodiment of the present invention. The image capturing lens system of the first embodiment of the present invention mainly comprises five lens elements, in order from an object side to an image side:

a first lens element 110 made of plastic with positive refractive power having a convex object-side surface 111 and a concave image-side surface 112, the object-side and image-side surfaces 111 and 112 thereof being aspheric;

a second lens element 120 made of plastic with negative refractive power having a concave object-side surface 121 and a convex image-side surface 122, the object-side and image-side surfaces 121 and 122 thereof being aspheric;

a third lens element 130 made of plastic with positive refractive power having a convex object-side surface 131 and a convex image-side surface 132, the object-side and image-side surfaces 131 and 132 thereof being aspheric;

a fourth lens element 140 made of plastic with positive refractive power having a concave object-side surface 141 and a convex image-side surface 142, the object-side and image-side surfaces 141 and 142 thereof being aspheric; and a fifth lens element 150 made of plastic with negative refractive power having a convex object-side surface 151 and a concave image-side surface 152, the object-side and image-side surfaces 151 and 152 thereof being aspheric, and at least one inflection point is formed on the image-side surface 152 thereof;

wherein an aperture stop 100 is disposed between the imaged object and the first lens element 110;

the image capturing lens system further comprises an IR-cut filter 160 disposed between the image-side surface 152 of the fifth lens element 150 and an image plane 170, and the IR-cut filter 160 is made of glass and has no influence on the focal length of the image capturing lens system; the image capturing lens system further comprises an image sensor 180 provided on the image plane 170.

The detailed optical data of the first embodiment is shown in TABLE 1, and the aspheric surface data is shown in TABLE 2, wherein the units of the curvature radius, the thickness and the focal length are expressed in mm, and HFOV is half of the maximal field of view.

TABLE 1

(Embodiment 1)
f = 3.05 mm, Fno = 2.08, HFOV = 36.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.167 | | | | |
| 2 | Lens 1 | 1.380 | ASP | 0.546 | Plastic | 1.544 | 55.9 | 2.80 |
| 3 | | 12.848 | ASP | 0.286 | | | | |
| 4 | Lens 2 | −1.297 | ASP | 0.240 | Plastic | 1.640 | 23.3 | −5.69 |
| 5 | | −2.162 | ASP | 0.084 | | | | |
| 6 | Lens 3 | 4.544 | ASP | 0.288 | Plastic | 1.544 | 55.9 | 5.97 |
| 7 | | −11.174 | ASP | 0.332 | | | | |
| 8 | Lens 4 | −1.097 | ASP | 0.431 | Plastic | 1.544 | 55.9 | 1.94 |
| 9 | | −0.613 | ASP | 0.050 | | | | |
| 10 | Lens 5 | 2.704 | ASP | 0.340 | Plastic | 1.535 | 56.3 | −1.69 |
| 11 | | 0.647 | ASP | 0.500 | | | | |
| 12 | IR-cur | Plano | | 0.210 | Glass | 1.517 | 64.2 | — |
| 13 | filter | Plano | | 0.574 | | | | |
| 14 | Image | Plano | | — | | | | |

*Reference wavelength is d-line 587.6 nm

TABLE 2

Aspheric Coefficients

| Surface # | 2 | 3 | 4 | 5 | 6 |
|---|---|---|---|---|---|
| k = | −1.5581E+00 | −1.0000E+00 | −8.2427E−01 | −6.7383E+00 | −6.2245E+01 |
| A4 = | 2.1067E−02 | −1.1436E−01 | 5.6892E−03 | −9.4431E−02 | −1.9839E−01 |
| A6 = | 2.9801E−01 | −2.8108E−01 | −4.6768E−02 | 5.2893E−02 | 4.8043E−01 |
| A8 = | −1.4966E+00 | 2.9404E−01 | −1.6276E−01 | −6.9849E−01 | −1.8548E+00 |
| A10 = | 3.2824E+00 | −1.4515E+00 | 4.7369E−01 | −8.0922E−02 | 4.4602E+00 |
| A12 = | −3.9033E+00 | 2.2487E+00 | 7.0419E−01 | 1.7227E+00 | −7.1276E+00 |
| A14 = | 1.3267E+00 | −1.1185E+00 | −7.7139E−01 | −1.2315E+00 | 4.1872E+00 |

| Surface # | 7 | 8 | 9 | 10 | 11 |
|---|---|---|---|---|---|
| k = | 3.0784E+00 | −9.7810E−01 | −3.7850E+00 | −5.1581E+01 | −6.4445E+00 |
| A4 = | −1.2848E−01 | −4.7791E−03 | −3.8010E−01 | −1.4061E−01 | −1.8372E−01 |
| A6 = | −3.6178E−01 | −3.9352E−01 | 5.6431E−01 | −2.9689E−02 | 1.2977E−01 |
| A8 = | 1.2863E+00 | 5.1041E−01 | −9.5920E−01 | 9.4657E−02 | −8.3267E−02 |
| A10 = | −1.8517E+00 | 9.5223E−01 | 1.3929E+00 | −8.6722E−02 | 3.2467E−02 |
| A12 = | 8.8016E−01 | −1.4846E+00 | −9.0378E−01 | 3.4881E−02 | −7.1878E−03 |
| A14 = | 6.6497E−02 | 5.2086E−01 | 2.0452E−01 | −4.9295E−03 | 6.6487E−04 |

The equation of the aspheric surface profiles is expressed as follows:

$$X(Y) = (Y^2/R)/(1 + \mathrm{sqrt}(1 - (1+k)*(Y/R)^2)) + \sum_i (Ai)*(Y^i)$$

wherein:

X: the relative distance between a point on the aspheric surface at a distance Y from the optical axis and the tangential plane at the aspheric surface vertex;

Y: the distance from the point on the curve of the aspheric surface to the optical axis;

R: the curvature radius;

k: the conic coefficient;

Ai: the aspheric coefficient of order i.

In the first embodiment of the present image capturing lens system, the focal length of the image capturing lens system is f, and it satisfies the following relation: f=3.05 (mm).

In the first embodiment of the present image capturing lens system, the f-number of the image capturing lens system is Fno, and it satisfies the relation: Fno=2.08.

In the first embodiment of the present image capturing lens system, half of the maximal field of view of the image capturing lens system is HFOV, and it satisfies the relation: HFOV=36.5 deg.

In the first embodiment of the present image capturing lens system, an Abbe number of the second lens element 120 is V2, an Abbe number of the first lens element 110 is V1, and they satisfy the relation: V2/V1=0.42.

In the first embodiment of the present image capturing lens system, an axial distance between the third lens element 130 and the fourth lens element 140 is T34, an axial distance between the fourth lens element 140 and the fifth lens element 150 is T45, an axial distance between the first lens element 110 and the second lens element 120 is T12, and they satisfy the relation: (T34+T45)/T12=1.34.

In the first embodiment of the present image capturing lens system, a curvature radius of the object-side surface 111 of the first lens element 110 is R1, a curvature radius of the image-side surface 112 of the first lens element 110 is R2, and they satisfy the following relation: (R1+R2)/(R1−R2)=−1.24.

In the first embodiment of the present image capturing lens system, a curvature radius of the image-side surface 122 of the second lens element 120 is R4, a curvature radius of the object-side surface 121 of the second lens element 120 is R3, and they satisfy the following relation: R4/R3=1.67.

In the first embodiment of the present image capturing lens system, a curvature radius of the image-side surface 122 of the second lens element 120 is R4, and they satisfy the following relation: 1/R4=−0.463 (mm$^{-1}$).

In the first embodiment of the present image capturing lens system, the focal length of the image capturing lens system is f, a curvature radius of the image-side surface 122 of the second lens element 120 is R4, and they satisfy the following relation: f/R4=−1.41.

In the first embodiment of the present image capturing lens system, the focal length of the image capturing lens system is f, a curvature radius of the image-side surface 132 of the third lens element 130 is R6, and they satisfy the following relation: f/R6=−0.27.

In the first embodiment of the present image capturing lens system, the focal length of the image capturing lens system is f, a curvature radius of the object-side surface 121 of the second lens element 120 is R3, a curvature radius of the image-side surface 122 of the second lens element 120 is R4, and they satisfy the following relation: (f/R3)+(f/R4)=−3.77.

In the first embodiment of the present image capturing lens system, a curvature radius of the object-side surface 141 of the fourth lens element 140 is R7, a curvature radius of the image-side surface 142 of the fourth lens element 140 is R8, and they satisfy the following relation: (R7−R8)/(R7+R8)= 0.28.

In the first embodiment of the present image capturing lens system, a focal length of the image capturing lens system is f, a focal length of the fourth lens element is f4, and they satisfy the following relation: f/f4=1.57.

In the first embodiment of the present image capturing lens system, an axial distance between the object-side surface 111 of the first lens element 110 and the image-side surface 152 of the fifth lens element 150 is TD, a curvature radius of the image-side surface 122 of the second lens element 120 is R4, and they satisfy the following relation: TD*R4=−5.61 (mm$^2$).

In the first embodiment of the present image capturing lens system, the axial distance between the object-side surface 111 of the first lens element 110 and the image plane 170 is TTL, half of the diagonal length of the effective photosensitive area of the image sensor 180 is ImgH, and they satisfy the following relation: TTL/ImgH=1.67.

Embodiment 2

Figure 2A:
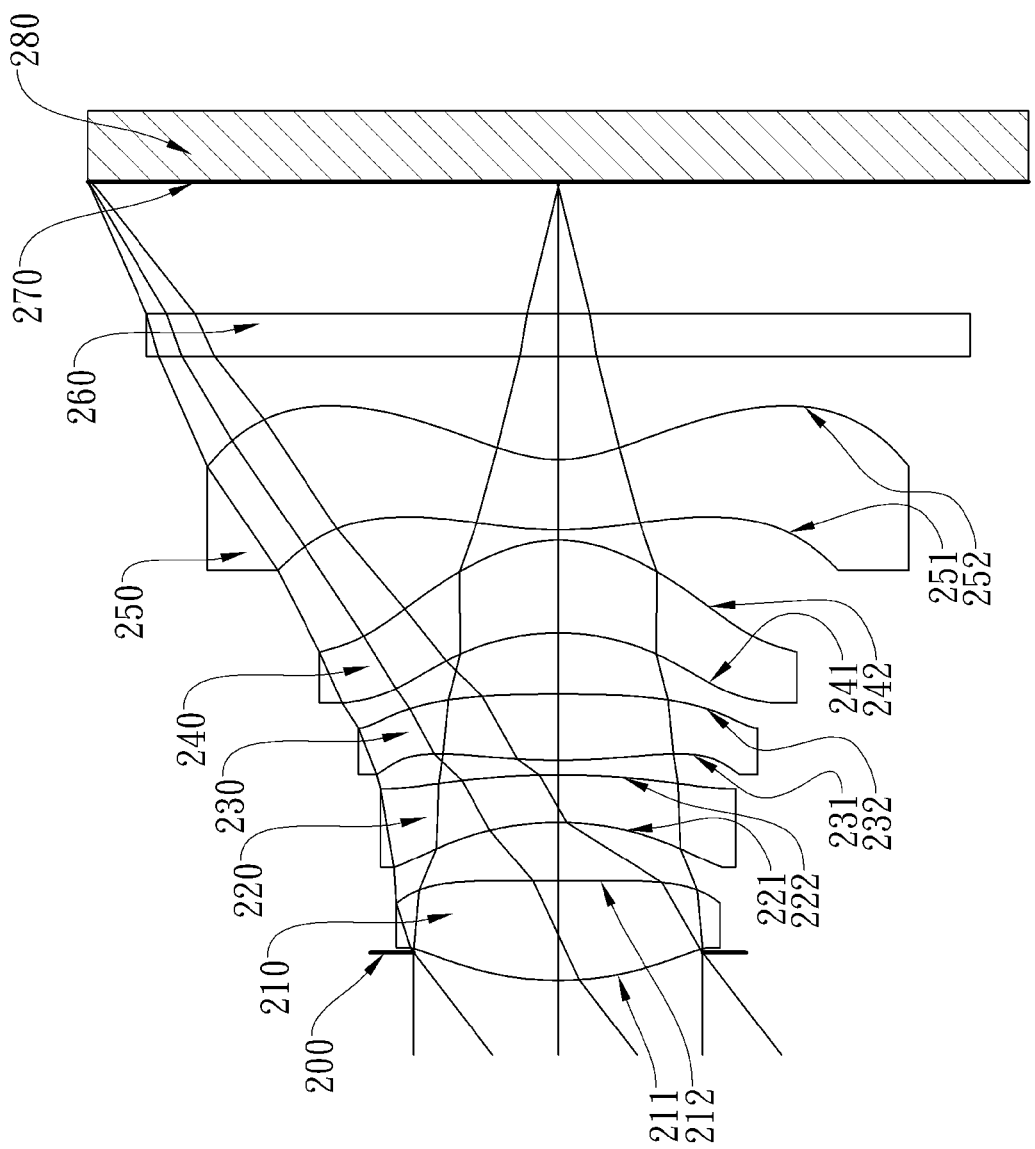
FIG. 2A shows an image capturing lens system in accordance with the second embodiment of the present invention.
Figure 2B:
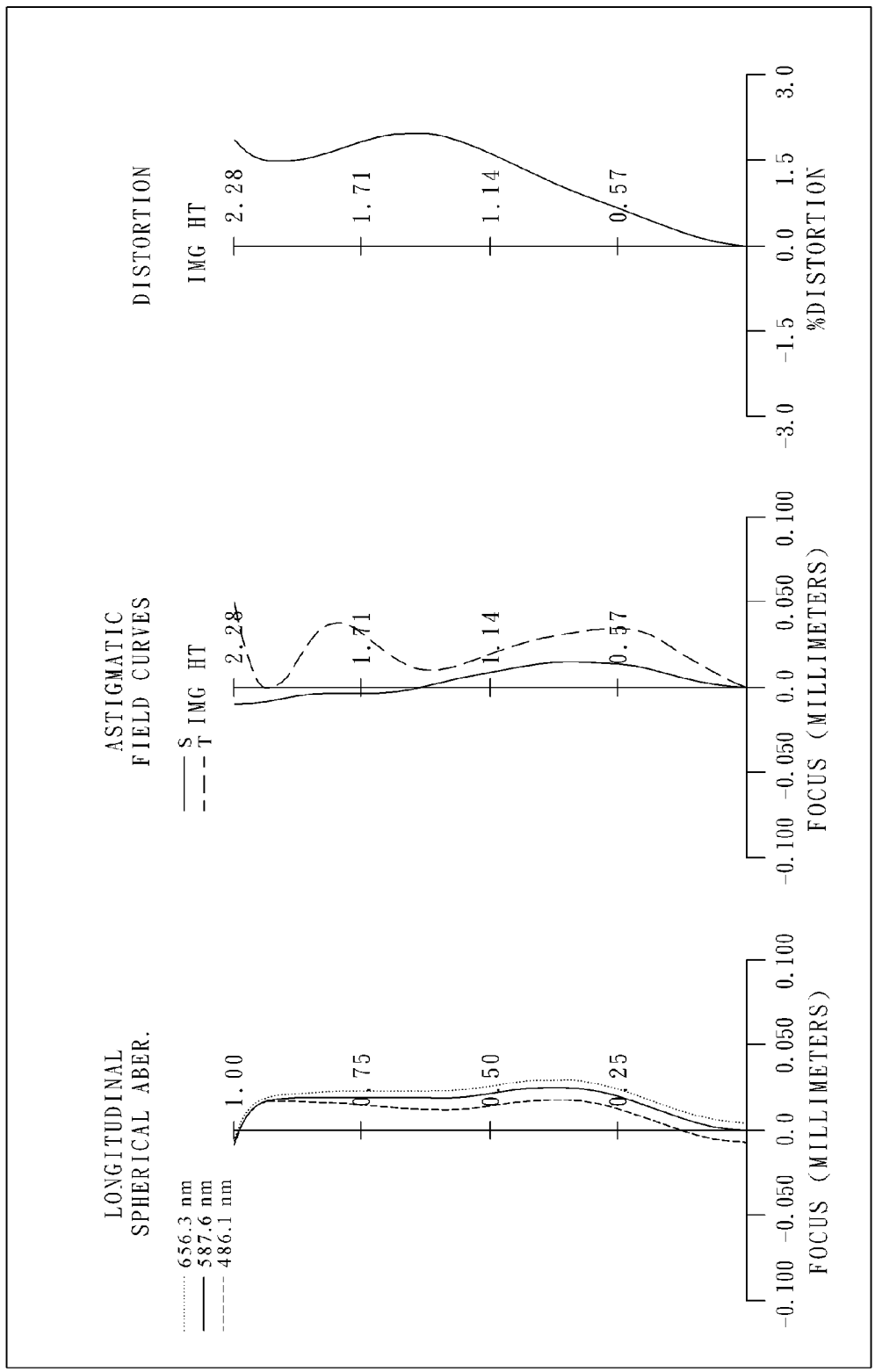
FIG. 2B shows the aberration curves of the second embodiment of the present invention.

FIG. 2A shows an image capturing lens system in accordance with the second embodiment of the present invention, and FIG. 2B shows the aberration curves of the second embodiment of the present invention. The image capturing lens system of the second embodiment of the present invention mainly comprises five lens elements, in order from an object side to an image side:

a first lens element 210 made of plastic with positive refractive power having a convex object-side surface 211 and a concave image-side surface 212, the object-side and image-side surfaces 211 and 212 thereof being aspheric;

a second lens element 220 made of plastic with negative refractive power having a concave object-side surface 221 and a convex image-side surface 222, the object-side and image-side surfaces 221 and 222 thereof being aspheric;

a third lens element 230 made of plastic with positive refractive power having a convex object-side surface 231 and a convex image-side surface 232, the object-side and image-side surfaces 231 and 232 thereof being aspheric;

a fourth lens element 240 made of plastic with positive refractive power having a concave object-side surface 241 and a convex image-side surface 242, the object-side and image-side surfaces 241 and 242 thereof being aspheric; and a fifth lens element 250 made of plastic with negative refractive power having a convex object-side surface 251 and a concave image-side surface 252, the object-side and image-side surfaces 251 and 252 thereof being aspheric, and at least one inflection point is formed on the image-side surface 252 thereof;

wherein an aperture stop 200 is disposed between the imaged object and the first lens element 210;

the image capturing lens system further comprises an IR-cut filter 260 disposed between the image-side surface 252 of the fifth lens element 250 and an image plane 270, and the IR-cut filter 260 is made of glass and has no influence on the focal length of the image capturing lens system; the image capturing lens system further comprises an image sensor 280 provided on the image plane 270.

The detailed optical data of the second embodiment is shown in TABLE 3, and the aspheric surface data is shown in TABLE 4, wherein the units of the curvature radius, the thickness and the focal length are expressed in mm, and HFOV is half of the maximal field of view.

TABLE 3

(Embodiment 2)
f = 2.92 mm, Fno = 2.08, HFOV = 37.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.136 | | | | |
| 2 | Lens 1 | 1.471 | ASP | 0.484 | Plastic | 1.544 | 55.9 | 2.81 |
| 3 | | 35.356 | ASP | 0.285 | | | | |
| 4 | Lens 2 | −1.425 | ASP | 0.230 | Plastic | 1.640 | 23.3 | −3.31 |
| 5 | | −4.624 | ASP | 0.071 | | | | |
| 6 | Lens 3 | 2.655 | ASP | 0.321 | Plastic | 1.544 | 55.9 | 3.84 |
| 7 | | −9.444 | ASP | 0.300 | | | | |
| 8 | Lens 4 | −1.133 | ASP | 0.450 | Plastic | 1.544 | 55.9 | 2.01 |
| 9 | | −0.634 | ASP | 0.050 | | | | |
| 10 | Lens 5 | 1.796 | ASP | 0.342 | Plastic | 1.535 | 56.3 | −1.92 |
| 11 | | 0.609 | ASP | 0.500 | | | | |
| 12 | IR-cut | Plano | | 0.210 | Glass | 1.517 | 64.2 | — |
| 13 | filter | Plano | | 0.642 | | | | |
| 14 | Image | Plano | | — | | | | |

*Reference wavelength is d-line 587.6 nm

TABLE 4

Aspheric Coefficients

| Surface # | 2 | 3 | 4 | 5 | 6 |
|---|---|---|---|---|---|
| k = | −1.4795E+00 | −1.0000E+00 | −1.0367E+00 | 1.1107E+01 | −3.7237E+01 |
| A4 = | 1.3954E−02 | −1.1108E−01 | 2.2347E−02 | −1.2983E−01 | −1.9839E−01 |
| A6 = | 2.2496E−01 | −3.4040E−01 | −3.1267E−01 | 4.8557E−01 | 4.8043E−01 |
| A8 = | −1.5270E+00 | 5.3692E−01 | 2.9925E−01 | −5.6711E−01 | −1.8548E+00 |
| A10 = | 3.6974E+00 | −1.7508E+00 | 9.7336E−02 | −3.1607E−01 | 4.4602E+00 |
| A12 = | −4.6201E+00 | 2.1962E+00 | 7.3122E−01 | 1.7481E+00 | −7.1276E+00 |
| A14 = | 1.3267E+00 | −1.1185E+00 | −7.7139E−01 | −1.2315E+00 | 4.1872E+00 |

| Surface # | 7 | 8 | 9 | 10 | 11 |
|---|---|---|---|---|---|
| k = | −1.9907E+01 | −1.0550E+00 | −3.8373E+00 | −1.3665E+01 | −5.0963E+00 |
| A4 = | −1.2848E−01 | −4.7791E−03 | −3.8010E−01 | −1.5953E−01 | −1.8372E−01 |
| A6 = | −3.6178E−01 | −3.9352E−01 | 5.6431E−01 | −1.6503E−01 | 1.2977E−01 |
| A8 = | 1.2863E+00 | 5.1041E−01 | −9.5920E−01 | 9.1567E−02 | −8.3267E−02 |
| A10 = | −1.8517E+00 | 9.5223E−01 | 1.3929E+00 | −8.5623E−02 | 3.2467E−02 |
| A12 = | 8.8016E−01 | −1.4846E+00 | −9.0378E−01 | 3.2391E−02 | −7.1878E−03 |
| A14 = | 6.6497E−02 | 5.2086E−01 | 2.0452E−01 | −4.3934E−03 | 6.6487E−04 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| f [mm] | 2.92 | f/R4 | −0.63 |
|---|---|---|---|
| Fno | 2.08 | f/R6 | −0.31 |
| HFOV [deg.] | 37.4 | (f/R3) + (f/R4) | −2.68 |
| V2/V1 | 0.42 | (R7 − R8)/(R7 + R8) | 0.28 |
| (T34 + T45)/T12 | 1.23 | f/f4 | 1.45 |
| (R1 + R2)/(R1 − R2) | −1.09 | Td * R4 [mm$^2$] | −11.71 |
| R4/R3 | 3.24 | TTL/ImgH | 1.67 |
| 1/R4 [mm$^{-1}$] | −0.216 | | |

Embodiment 3

Figure 3A:
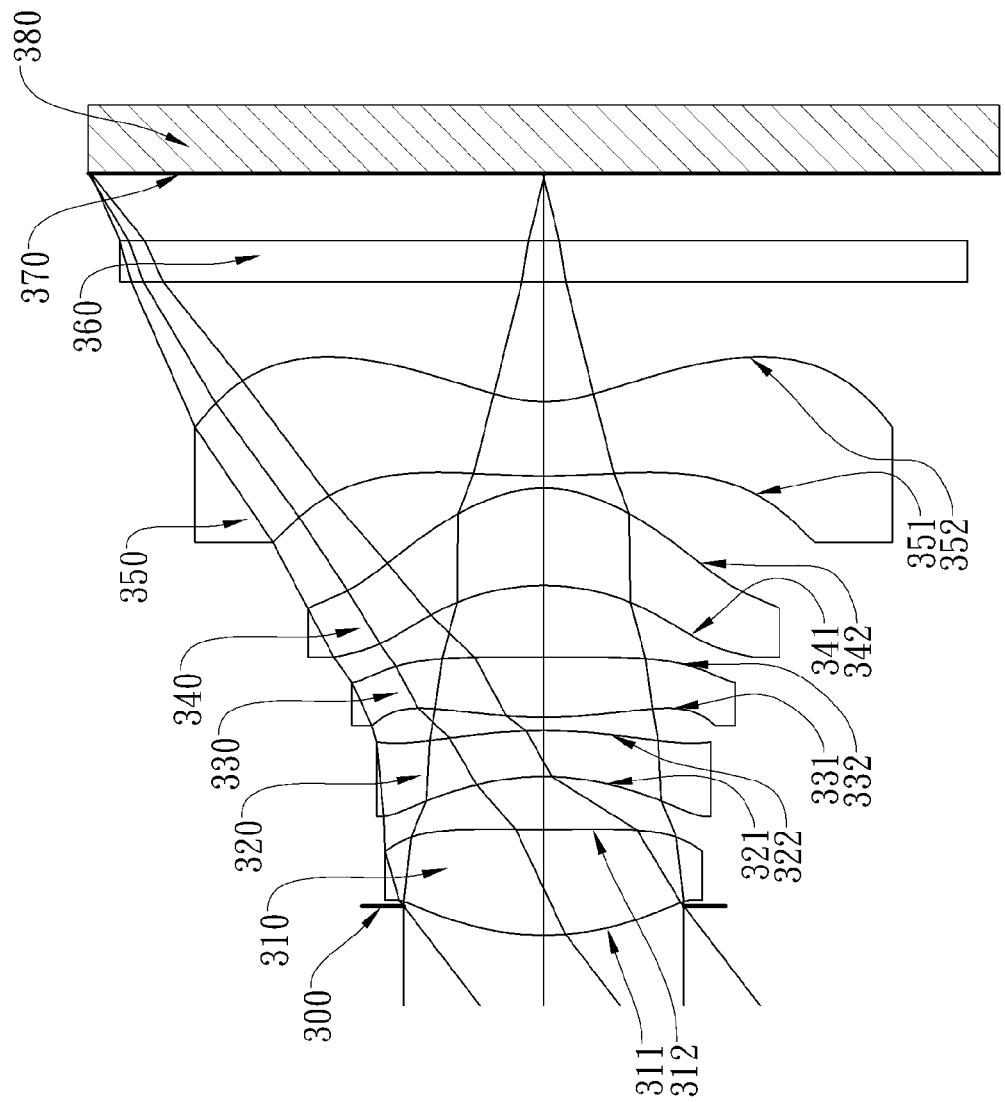
FIG. 3A shows an image capturing lens system in accordance with the third embodiment of the present invention.
Figure 3B:
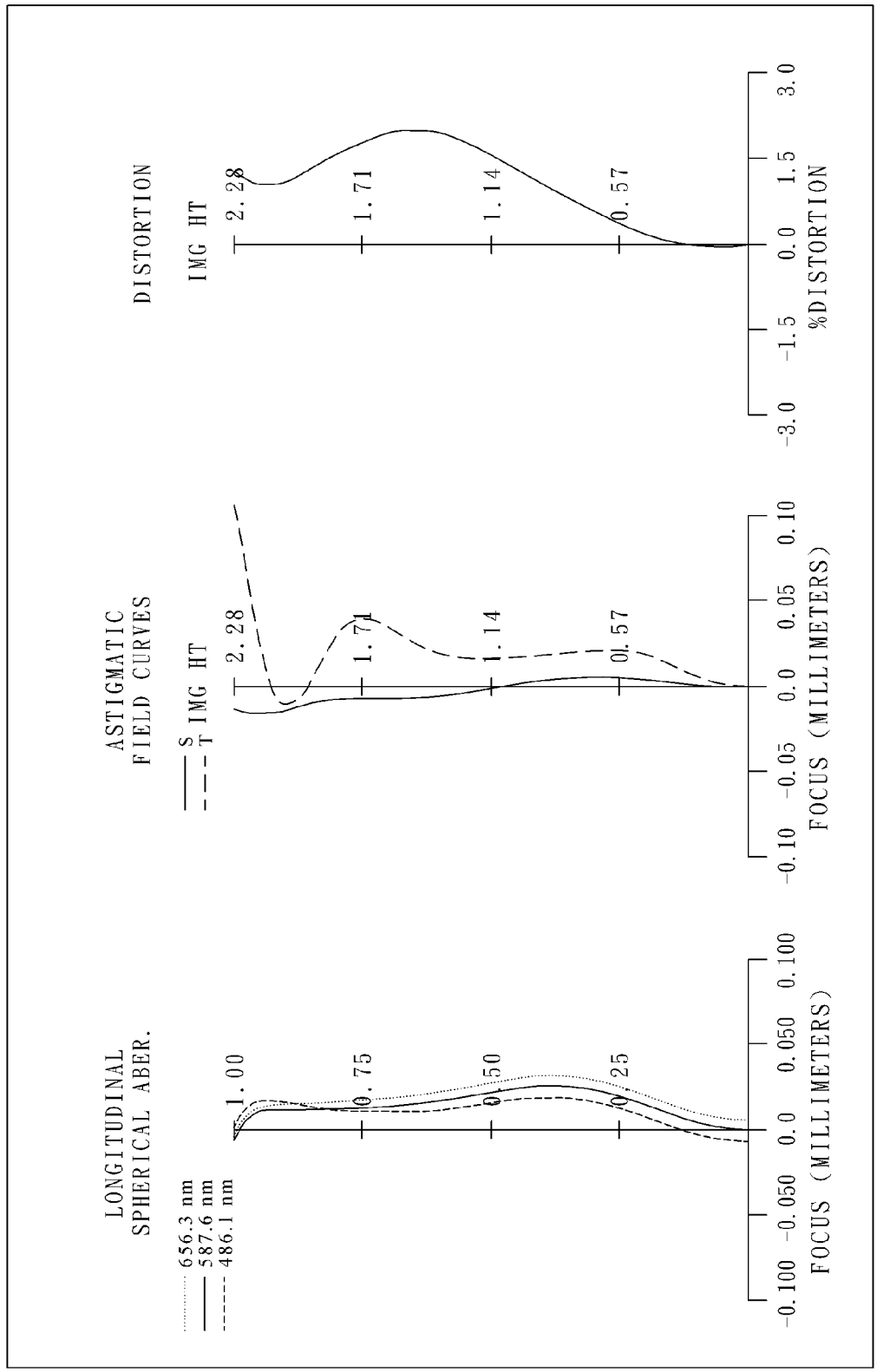
FIG. 3B shows the aberration curves of the third embodiment of the present invention.

FIG. 3A shows an image capturing lens system in accordance with the third embodiment of the present invention, and FIG. 3B shows the aberration curves of the third embodiment of the present invention. The image capturing lens system of the third embodiment of the present invention mainly comprises five lens elements, in order from an object side to an image side:

a first lens element 310 made of plastic with positive refractive power having a convex object-side surface 311 and a concave image-side surface 312, the object-side and image-side surfaces 311 and 312 thereof being aspheric;

a second lens element 320 made of plastic with negative refractive power having a concave object-side surface 321 and a convex image-side surface 322, the object-side and image-side surfaces 321 and 322 thereof being aspheric;

a third lens element 330 made of plastic with positive refractive power having a convex object-side surface 331 and a concave image-side surface 332, the object-side and image-side surfaces 331 and 332 thereof being aspheric;

a fourth lens element 340 made of plastic with positive refractive power having a concave object-side surface 341 and a convex image-side surface 342, the object-side and image-side surfaces 341 and 342 thereof being aspheric; and a fifth lens element 350 made of plastic with negative refractive power having a convex object-side surface 351 and a concave image-side surface 352, the object-side and image-side surfaces 351 and 352 thereof being aspheric, and at least one inflection point is formed on the image-side surface 352 thereof;

wherein an aperture stop 300 is disposed between the imaged object and the first lens element 310;

the image capturing lens system further comprises an IR-cut filter 360 disposed between the image-side surface 352 of the fifth lens element 350 and an image plane 370, and the IR-cut filter 360 is made of glass and has no influence on the focal length of the image capturing lens system; the image capturing lens system further comprises an image sensor 380 provided on the image plane 370.

The detailed optical data of the third embodiment is shown in TABLE 6, and the aspheric surface data is shown in TABLE 7, wherein the units of the curvature radius, the thickness and the focal length are expressed in mm, and HFOV is half of the maximal field of view.

TABLE 6

(Embodiment 3)
f = 2.92 mm, Fno = 2.08, HFOV = 37.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.144 | | | | |
| 2 | Lens 1 | 1.394 | ASP | 0.530 | Plastic | 1.535 | 56.3 | 2.75 |
| 3 | | 23.109 | ASP | 0.266 | | | | |
| 4 | Lens 2 | −1.295 | ASP | 0.230 | Plastic | 1.650 | 21.4 | −4.12 |
| 5 | | −2.686 | ASP | 0.067 | | | | |

TABLE 6-continued (Embodiment 3)
f = 2.92 mm, Fno = 2.08, HFOV = 37.5 deg.

| Surface # | | Curvature Radius | | Thickness | Material | Index | Abbe # | Focal length |
|---|---|---|---|---|---|---|---|---|
| 6 | Lens 3 | 2.210 | ASP | 0.302 | Plastic | 1.544 | 55.9 | 4.28 |
| 7 | | 41.667 | ASP | 0.360 | | | | |
| 8 | Lens 4 | −1.148 | ASP | 0.489 | Plastic | 1.544 | 55.9 | 1.90 |
| 9 | | −0.626 | ASP | 0.060 | | | | |
| 10 | Lens 5 | 3.423 | ASP | 0.374 | Plastic | 1.535 | 56.3 | −1.65 |
| 11 | | 0.674 | ASP | 0.600 | | | | |
| 12 | IR-cut | Plano | | 0.210 | Glass | 1.517 | 64.2 | — |
| 13 | filter | Plano | | 0.336 | | | | |
| 14 | Image | Plano | | — | | | | |

*Reference wavelength is d-line 587.6 nm

TABLE 7

Aspheric Coefficients

| Surface # | 2 | 3 | 4 | 5 | 6 |
|---|---|---|---|---|---|
| k = | −1.4717E+00 | 1.0000E+01 | −2.7540E+00 | −1.6678E+01 | −1.7951E+01 |
| A4 = | 1.7999E−02 | −1.1302E−01 | 7.4733E−02 | −7.0864E−02 | −1.9723E−01 |
| A6 = | 2.3010E−01 | −3.2532E−01 | −2.1034E−01 | 5.3593E−01 | 4.7155E−01 |
| A8 = | −1.3890E+00 | 4.0844E−01 | −2.0637E−01 | −7.6414E−01 | −1.8328E+00 |
| A10 = | 3.2587E+00 | −1.5411E+00 | 5.2996E−01 | −1.5536E−01 | 4.3989E+00 |
| A12 = | −4.0968E+00 | 2.1875E+00 | 7.3954E−01 | 1.7505E+00 | −7.1383E+00 |
| A14 = | 1.3267E+00 | −1.1185E+00 | −7.7139E−01 | −1.2232E+00 | 4.1677E+00 |

| Surface # | 7 | 8 | 9 | 10 | 11 |
|---|---|---|---|---|---|
| k = | −2.0000E+01 | −7.5577E−01 | −3.5827E+00 | −8.9664E+01 | −6.3329E+00 |
| A4 = | −1.2097E−01 | −1.5187E−02 | −3.9053E−01 | −1.5196E−01 | −1.7302E−01 |
| A6 = | −3.8122E−01 | −3.7454E−01 | 5.5357E−01 | −5.9941E−03 | 1.2834E−01 |
| A8 = | 1.2589E+00 | 5.1757E−01 | −9.5666E−01 | 8.1272E−02 | −8.3800E−02 |
| A10 = | −1.8699E+00 | 9.5291E−01 | 1.3978E+00 | −8.9404E−02 | 3.2323E−02 |
| A12 = | 9.1349E−01 | −1.4895E+00 | −9.0242E−01 | 3.5154E−02 | −7.0599E−03 |
| A14 = | 6.6429E−02 | 5.1843E−01 | 2.0177E−01 | −4.2032E−03 | 6.5483E−04 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| f [mm] | 2.92 | f/R4 | −1.09 |
|---|---|---|---|
| Fno | 2.08 | f/R6 | 0.07 |
| HFOV [deg.] | 37.5 | (f/R3) + (f/R4) | −3.35 |
| V2/V1 | 0.38 | (R7 − R8)/(R7 + R8) | 0.29 |
| (T34 + T45)/T12 | 1.58 | f/f4 | 1.54 |
| (R1 + R2)/(R1 − R2) | −1.13 | Td * R4 [mm$^2$] | −7.19 |
| R4/R3 | 2.07 | TTL/ImgH | 1.64 |
| 1/R4 [mm$^{-1}$] | −0.372 | | |

Embodiment 4

Figure 4A:
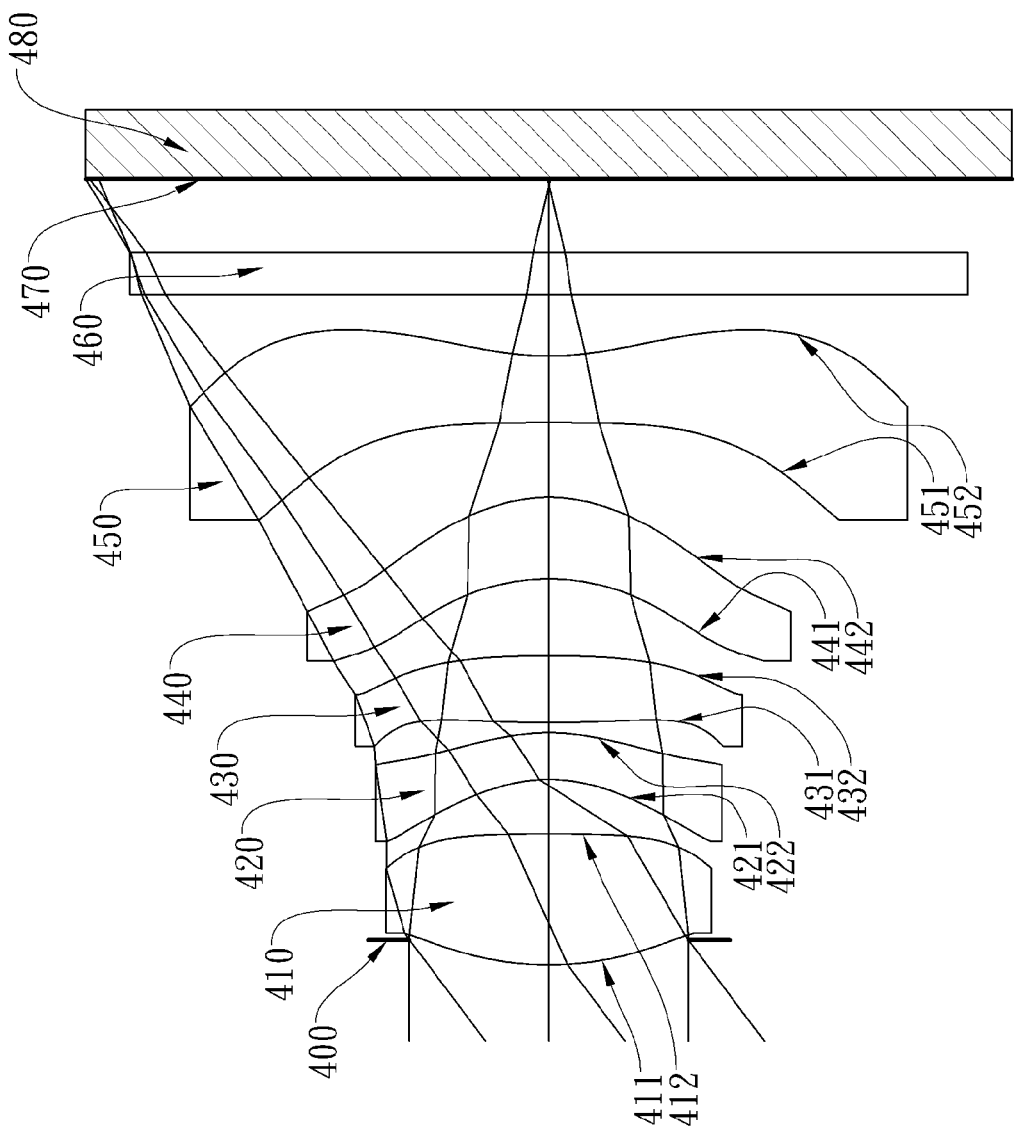
FIG. 4A shows an image capturing lens system in accordance with the fourth embodiment of the present invention.
Figure 4B:
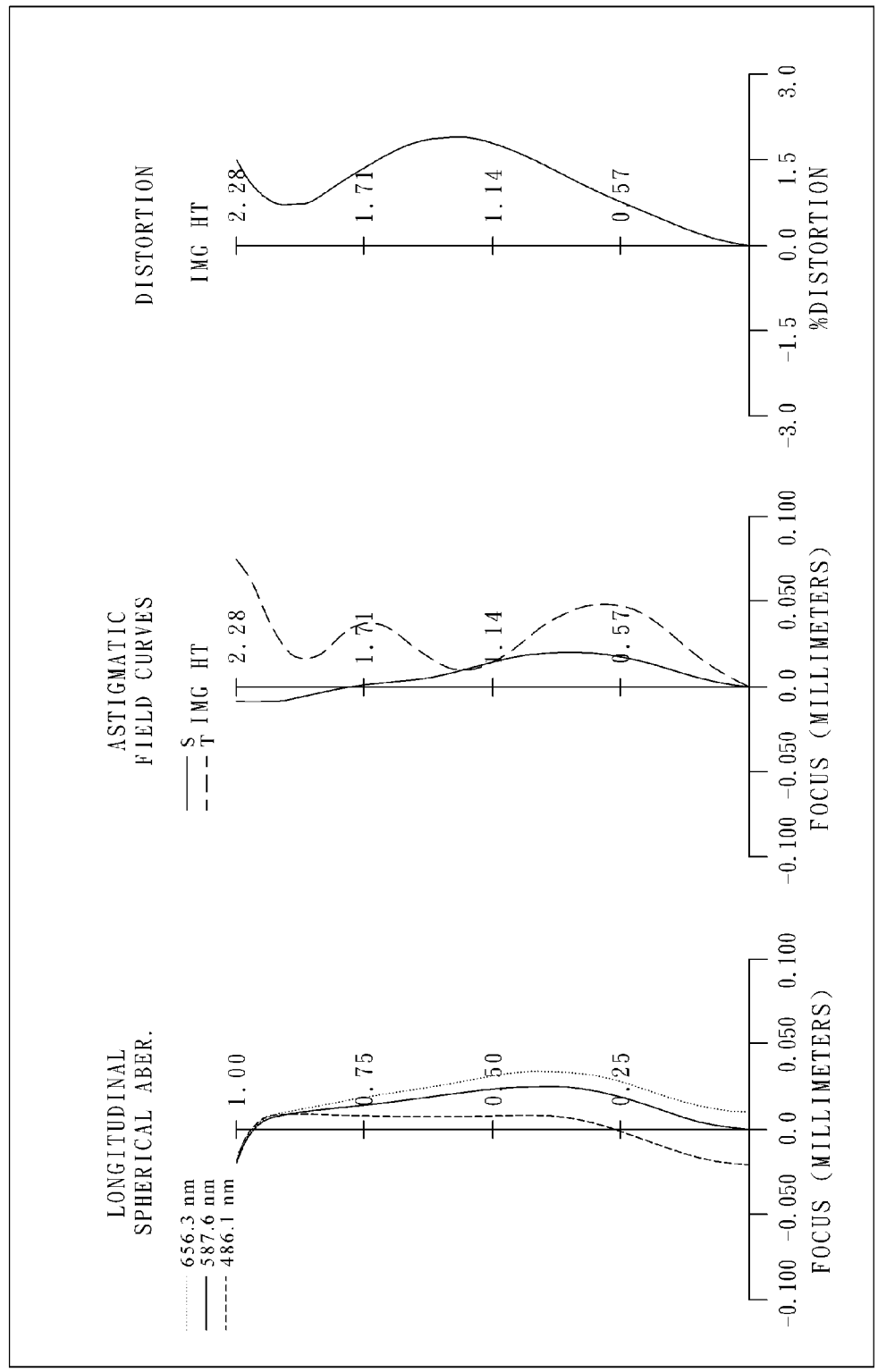
FIG. 4B shows the aberration curves of the fourth embodiment of the present invention.

FIG. 4A shows an image capturing lens system in accordance with the fourth embodiment of the present invention, and FIG. 4B shows the aberration curves of the fourth embodiment of the present invention. The image capturing lens system of the fourth embodiment of the present invention mainly comprises five lens elements, in order from an object side to an image side:

a first lens element 410 made of plastic with positive refractive power having a convex object-side surface 411 and a convex image-side surface 412, the object-side and image-side surfaces 411 and 412 thereof being aspheric;

a second lens element 420 made of plastic with negative refractive power having a concave object-side surface 421 and a convex image-side surface 422, the object-side and image-side surfaces 421 and 422 thereof being aspheric;

a third lens element 430 made of plastic with positive refractive power having a convex object-side surface 431 and a convex image-side surface 432, the object-side and image-side surfaces 431 and 432 thereof being aspheric;

a fourth lens element 440 made of plastic with positive refractive power having a concave object-side surface 441 and a convex image-side surface 442, the object-side and image-side surfaces 441 and 442 thereof being aspheric; and a fifth lens element 450 made of plastic with negative refractive power having a concave object-side surface 451 and a concave image-side surface 452, the object-side and image-side surfaces 451 and 452 thereof being aspheric, and at least one inflection point is formed on the image-side surface 452 thereof;

wherein an aperture stop 400 is disposed between the imaged object and the first lens element 410;

the image capturing lens system further comprises an IR-cut filter 460 disposed between the image-side surface 452 of the fifth lens element 450 and an image plane 470, and the IR-cut filter 460 is made of glass and has no influence on the focal length of the image capturing lens system; the image capturing lens system further comprises an image sensor 480 provided on the image plane 470.

The detailed optical data of the fourth embodiment is shown in TABLE 9, and the aspheric surface data is shown in TABLE 10, wherein the units of the curvature radius, the thickness and the focal length are expressed in mm, and HFOV is half of the maximal field of view.

TABLE 9

(Embodiment 4)
f = 3.00 mm, Fno = 2.18, HFOV = 36.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.124 | | | | |
| 2 | Lens 1 | 1.483 | ASP | 0.646 | Plastic | 1.543 | 56.5 | 2.54 |
| 3 | | −16.427 | ASP | 0.270 | | | | |
| 4 | Lens 2 | −0.783 | ASP | 0.230 | Plastic | 1.640 | 23.3 | −5.99 |
| 5 | | −1.097 | ASP | 0.050 | | | | |
| 6 | Lens 3 | 5.266 | ASP | 0.330 | Plastic | 1.544 | 55.9 | 5.14 |
| 7 | | −5.844 | ASP | 0.381 | | | | |
| 8 | Lens 4 | −1.025 | ASP | 0.401 | Plastic | 1.544 | 55.9 | 4.24 |
| 9 | | −0.808 | ASP | 0.369 | | | | |
| 10 | Lens 5 | −35.657 | ASP | 0.330 | Plastic | 1.535 | 56.3 | −2.44 |
| 11 | | 1.357 | ASP | 0.300 | | | | |
| 12 | IR-cut | Plano | | 0.210 | Glass | 1.517 | 64.2 | — |
| 13 | filter | Plano | | 0.364 | | | | |
| 14 | Image | Plano | | — | | | | |

*Reference wavelength is d-line 587.6 nm

TABLE 10

Aspheric Coefficients

| Surface # | 3 | 4 | 5 | 6 | |
|---|---|---|---|---|---|
| k = | −1.5592E+00 | −1.0000E+00 | −2.1599E+00 | −5.3245E+00 | 3.4758E+00 |
| A4 = | 1.4238E−02 | −1.9367E−01 | 6.2264E−02 | 4.2600E−02 | −1.9504E−01 |
| A6 = | 1.7548E−01 | −3.0525E−01 | 6.9640E−02 | 5.9086E−01 | 3.2664E−01 |
| A8 = | −1.2710E+00 | 2.7925E−01 | −8.0550E−01 | −8.8888E−01 | −1.7188E+00 |
| A10 = | 3.1518E+00 | −1.2737E+00 | 9.0982E−01 | −2.8495E−01 | 4.3357E+00 |
| A12 = | −4.0854E+00 | 2.1945E+00 | 7.3399E−01 | 1.7484E+00 | −7.1276E+00 |
| A14 = | 1.3267E+00 | −1.1185E+00 | −7.7139E−01 | −1.2317E+00 | 4.1872E+00 |

| Surface # | 7 | 8 | 9 | 10 | 11 |
|---|---|---|---|---|---|
| k = | 1.5862E+01 | −1.1564E+00 | −3.5888E+00 | 9.0000E+01 | −7.9373E+00 |
| A4 = | −1.4729E−01 | −6.5717E−03 | −3.7681E−01 | −1.6899E−01 | −1.7527E−01 |
| A6 = | −3.1865E−01 | −4.1117E−01 | 5.4808E−01 | −2.0710E−03 | 1.2926E−01 |
| A8 = | 1.2334E+00 | 5.1206E−01 | −9.6137E−01 | 9.0980E−02 | −8.2983E−02 |
| A10 = | −1.8752E+00 | 9.5671E−01 | 1.3951E+00 | −8.8913E−02 | 3.2109E−02 |
| A12 = | 9.6512E−01 | −1.4836E+00 | −9.0278E−01 | 3.5012E−02 | −7.1702E−03 |
| A14 = | 6.6497E−02 | 5.1645E−01 | 2.0391E−01 | −4.6498E−03 | 7.0002E−04 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f [mm] | 3.00 | f/R4 | −2.73 |
|---|---|---|---|
| Fno | 2.18 | f/R6 | −0.51 |
| HFOV [deg.] | 36.8 | (f/R3) + (f/R4) | −6.56 |
| V2/V1 | 0.41 | (R7 − R8)/(R7 + R8) | 0.12 |
| (T34 + T45)/T12 | 2.77 | f/f4 | 0.71 |
| (R1 + R2)/(R1 − R2) | −0.83 | Td * R4 [mm$^2$] | −3.30 |
| R4/R3 | 1.40 | TTL/ImgH | 1.67 |
| 1/R4 [mm$^{-1}$] | −0.912 | | |

Embodiment 5

Figure 5A:
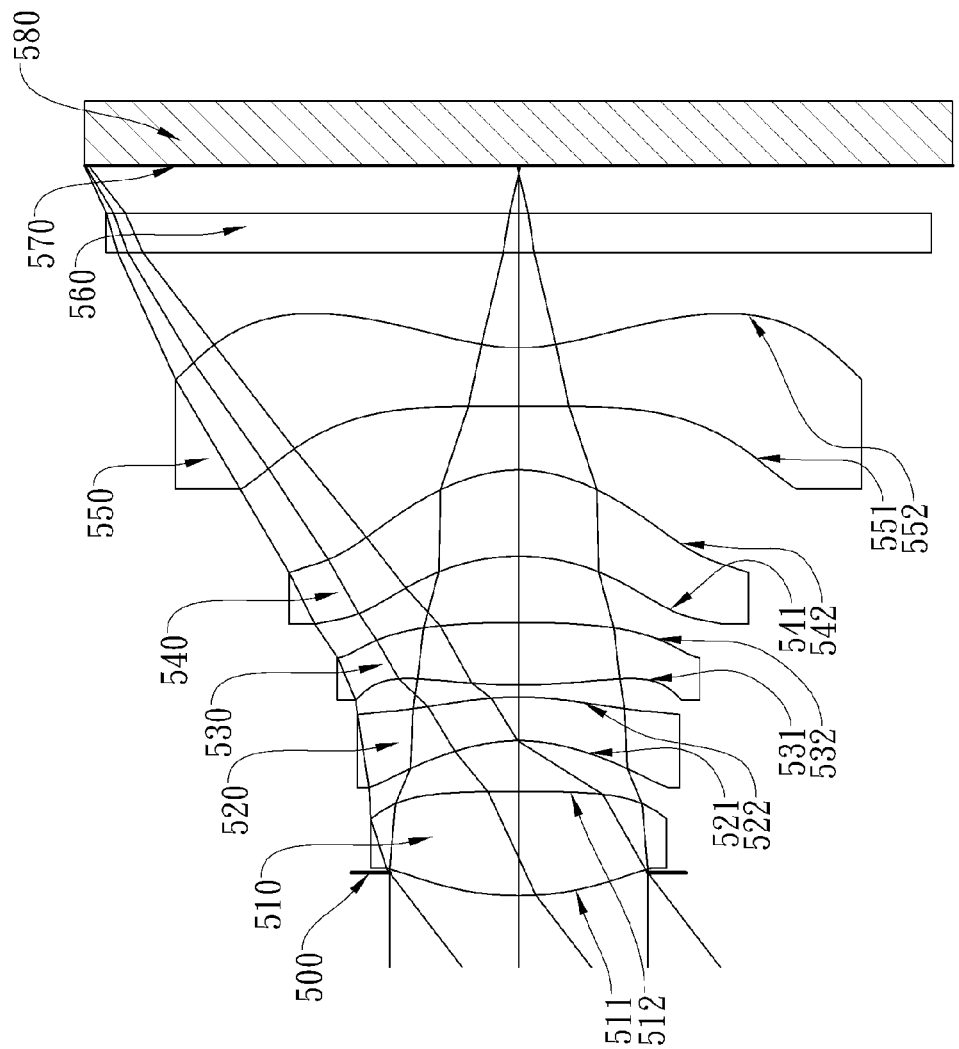
FIG. 5A shows an image capturing lens system in accordance with the fifth embodiment of the present invention.
Figure 5B:
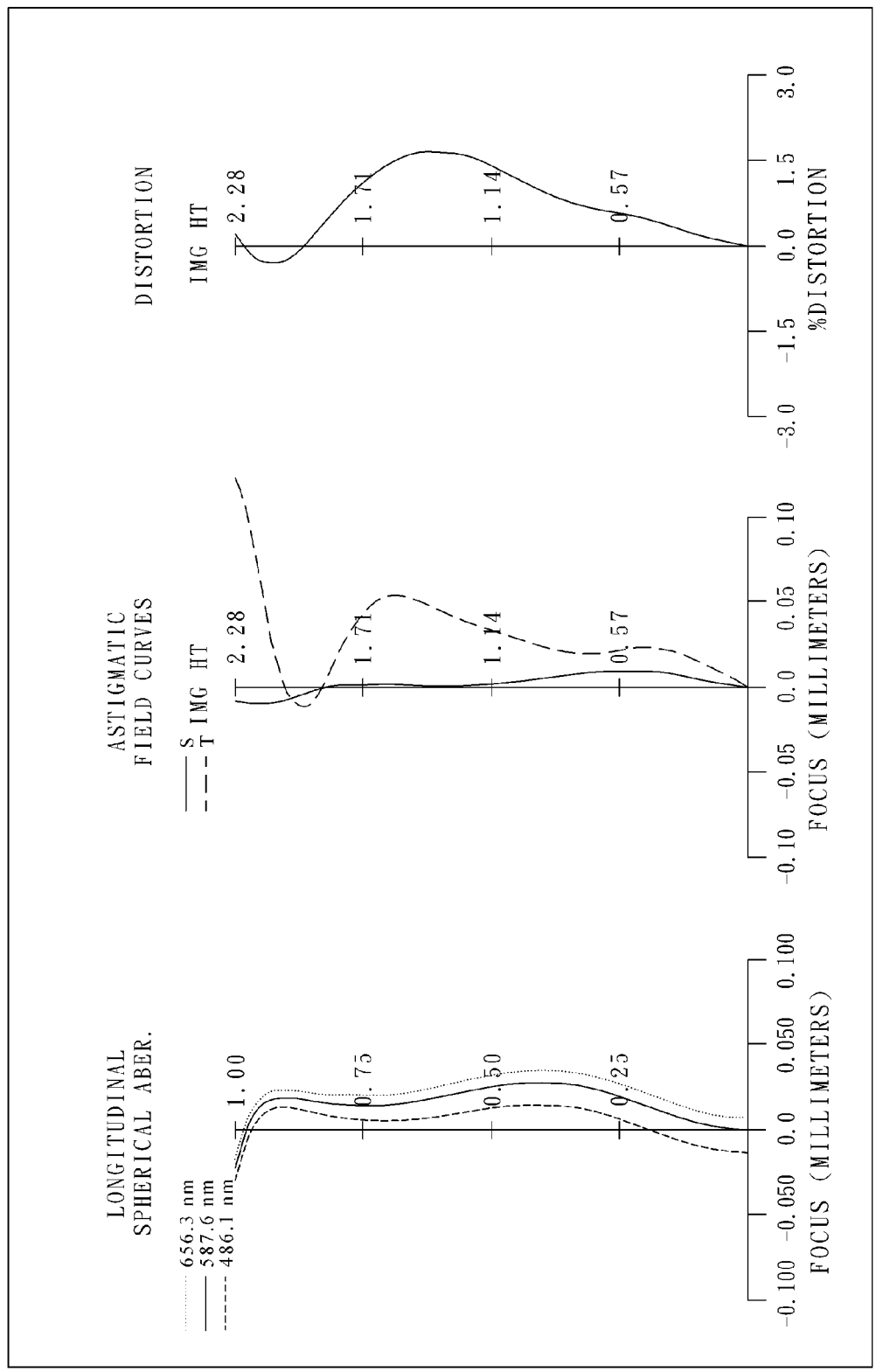
FIG. 5B shows the aberration curves of the fifth embodiment of the present invention.

FIG. 5A shows an image capturing lens system in accordance with the fifth embodiment of the present invention, and FIG. 5B shows the aberration curves of the fifth embodiment of the present invention. The image capturing lens system of the fifth embodiment of the present invention mainly comprises five lens elements, in order from an object side to an image side:

a first lens element 510 made of plastic with positive refractive power having a convex object-side surface 511 and a convex image-side surface 512, the object-side and image-side surfaces 511 and 512 thereof being aspheric;

a second lens element 520 made of plastic with negative refractive power having a concave object-side surface 521 and a convex image-side surface 522, the object-side and image-side surfaces 521 and 522 thereof being aspheric;

a third lens element 530 made of plastic with positive refractive power having a convex object-side surface 531 and a convex image-side surface 532, the object-side and image-side surfaces 531 and 532 thereof being aspheric;

a fourth lens element 540 made of plastic with positive refractive power having a concave object-side surface 541 and a convex image-side surface 542, the object-side and image-side surfaces 541 and 542 thereof being aspheric; and a fifth lens element 550 made of plastic with negative refractive power having a convex object-side surface 551 and a concave image-side surface 552, the object-side and image-side surfaces 551 and 552 thereof being aspheric, and at least one inflection point is formed on the image-side surface 552 thereof;

wherein an aperture stop 500 is disposed between the imaged object and the first lens element 510;

the image capturing lens system further comprises an IR-cut filter 560 disposed between the image-side surface 552 of the fifth lens element 550 and an image plane 570, and the IR-cut filter 560 is made of glass and has no influence on the focal length of the image capturing lens system; the image capturing lens system further comprises an image sensor 580 provided on the image plane 570.

The detailed optical data of the fifth embodiment is shown in TABLE 12, and the aspheric surface data is shown in TABLE 13, wherein the units of the curvature radius, the thickness and the focal length are expressed in mm, and HFOV is half of the maximal field of view.

TABLE 12

(Embodiment 5)

f = 2.97 mm, Fno = 2.18, HFOV = 37.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | | | | | |
| 2 | Len 1 | 1.480 | ASP | 0.550 | Plastic | 1.530 | 55.8 | 2.57 |
| 3 | | −15.139 | ASP | 0.268 | | | | |
| 4 | Lens 2 | −0.952 | ASP | 0.230 | Plastic | 1.614 | 25.6 | −3.61 |
| 5 | | −1.823 | ASP | 0.063 | | | | |
| 6 | Lens 3 | 2.601 | ASP | 0.330 | Plastic | 1.530 | 55.8 | 3.62 |
| 7 | | −6.988 | ASP | 0.351 | | | | |
| 8 | Lens 4 | −1.090 | ASP | 0.455 | Plastic | 1.544 | 55.9 | 3.09 |
| 9 | | −0.759 | ASP | 0.334 | | | | |
| 10 | Lens 5 | 22.535 | ASP | 0.311 | Plastic | 1.530 | 55.8 | −2.08 |
| 11 | | 1.047 | ASP | 0.500 | | | | |
| 12 | IR-cut | Plano | | 0.210 | Glass | 1.517 | 64.2 | — |
| 13 | filter | Plano | | 0.250 | | | | |
| 14 | Image | Plano | | — | | | | |

*Reference wavelength is d-line 587.6 nm

TABLE 13

Aspheric Coefficients

| Surface # | 2 | 3 | 4 | 5 | 6 |
|---|---|---|---|---|---|
| k = | −1.7734E+00 | −1.0000E+00 | −2.7483E+00 | −9.5240E+00 | −2.5304E+01 |
| A4 = | 7.5853E−03 | −1.6805E−01 | 7.6366E−02 | 3.6319E−02 | −1.9328E−01 |
| A6 = | 1.8008E−01 | −2.7675E−01 | 3.0306E−02 | 5.5606E−01 | 4.1703E−01 |
| A8 = | −1.2714E+00 | 3.5301E−01 | −8.1487E−01 | −8.9537E−01 | −1.7140E+00 |
| A10 = | 2.9836E+00 | −1.5253E+00 | 9.1020E−01 | −2.7715E−01 | 4.2089E+00 |
| A12 = | −4.2182E+00 | 2.1945E+00 | 7.8058E−01 | 1.7656E+00 | −7.1276E+00 |
| A14 = | 1.5688E+00 | −1.1185E+00 | −7.7139E−01 | −1.2317E+00 | 4.1872E+00 |

| Surface # | 7 | 8 | 9 | 10 | 11 |
|---|---|---|---|---|---|
| k = | 4.6577E+00 | −1.1464E+00 | −3.6646E+00 | 9.9745E+00 | −6.7325E+00 |
| A4 = | −1.1290E−01 | −1.6204E−03 | −3.6893E−01 | −1.7012E−01 | −1.6677E−01 |
| A6 = | −3.6506E−01 | −3.9898E−01 | 5.5289E−01 | −2.2842E−03 | 1.2821E−01 |
| A8 = | 1.2137E+00 | 5.1711E−01 | −9.6093E−01 | 9.1145E−02 | −8.3276E−02 |
| A10 = | −1.8762E+00 | 9.5649E−01 | 1.3957E+00 | −8.9053E−02 | 3.2258E−02 |
| A12 = | 9.6997E−01 | −1.4853E+00 | −9.0224E−01 | 3.5033E−02 | −7.1535E−03 |
| A14 = | 7.3444E−02 | 5.1443E−01 | 2.0358E−01 | −4.6697E−03 | 6.8650E−04 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| | | | |
|---|---|---|---|
| f [mm] | 2.97 | f/R4 | −1.63 |
| Fno | 2.18 | f/R6 | −0.42 |
| HFOV [deg.] | 37.4 | (f/R3) + (f/R4) | −4.74 |
| V2/V1 | 0.46 | (R7 − R8)/(R7 + R8) | 0.18 |
| (T34 + T45)/T12 | 2.56 | f/f4 | 0.96 |
| (R1 + R2)/(R1 − R2) | −0.82 | Td * R4 [mm²] | −5.27 |
| R4/R3 | 1.91 | TTL/ImgH | 1.66 |
| 1/R4 [mm⁻¹] | −0.549 | | |

Embodiment 6

Figure 6A:
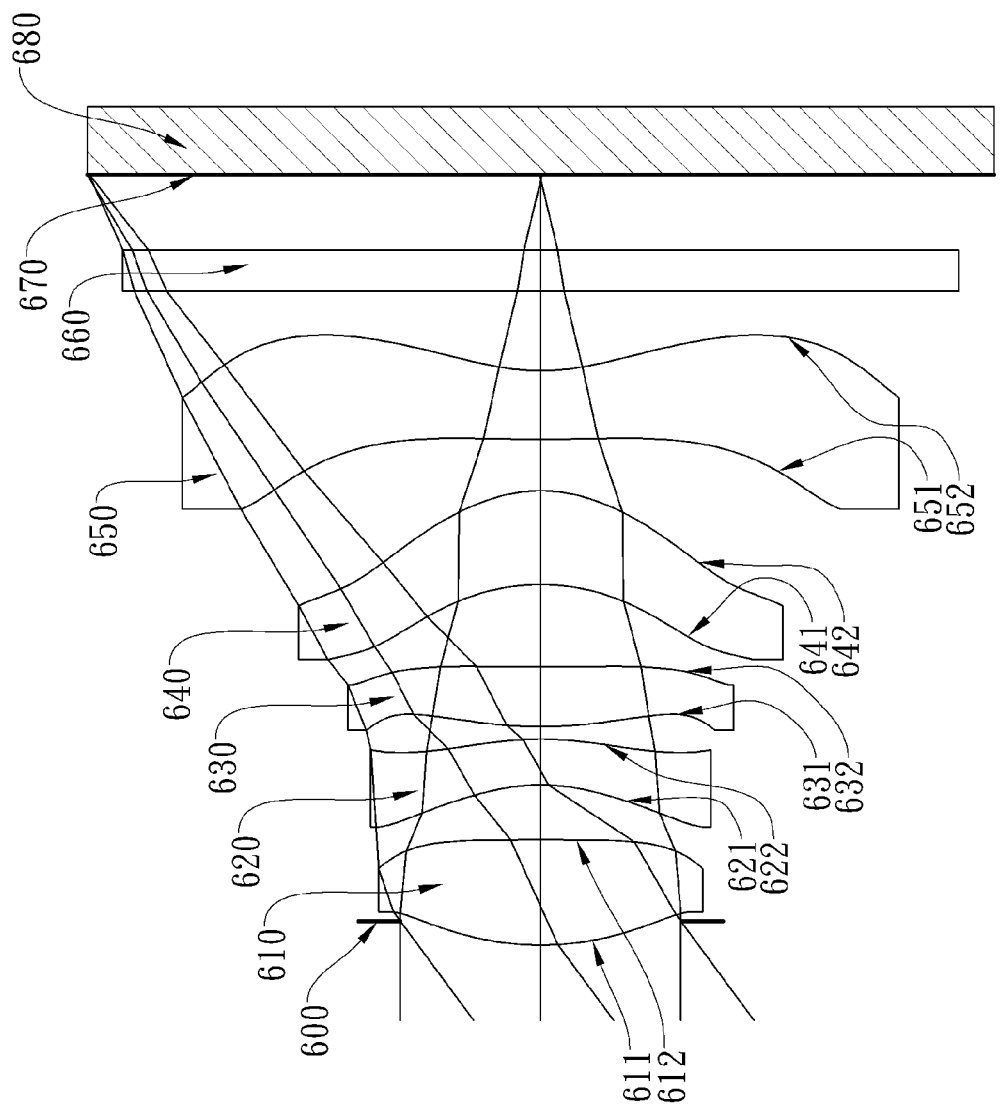
FIG. 6A shows an image capturing lens system in accordance with the sixth embodiment of the present invention.
Figure 6B:
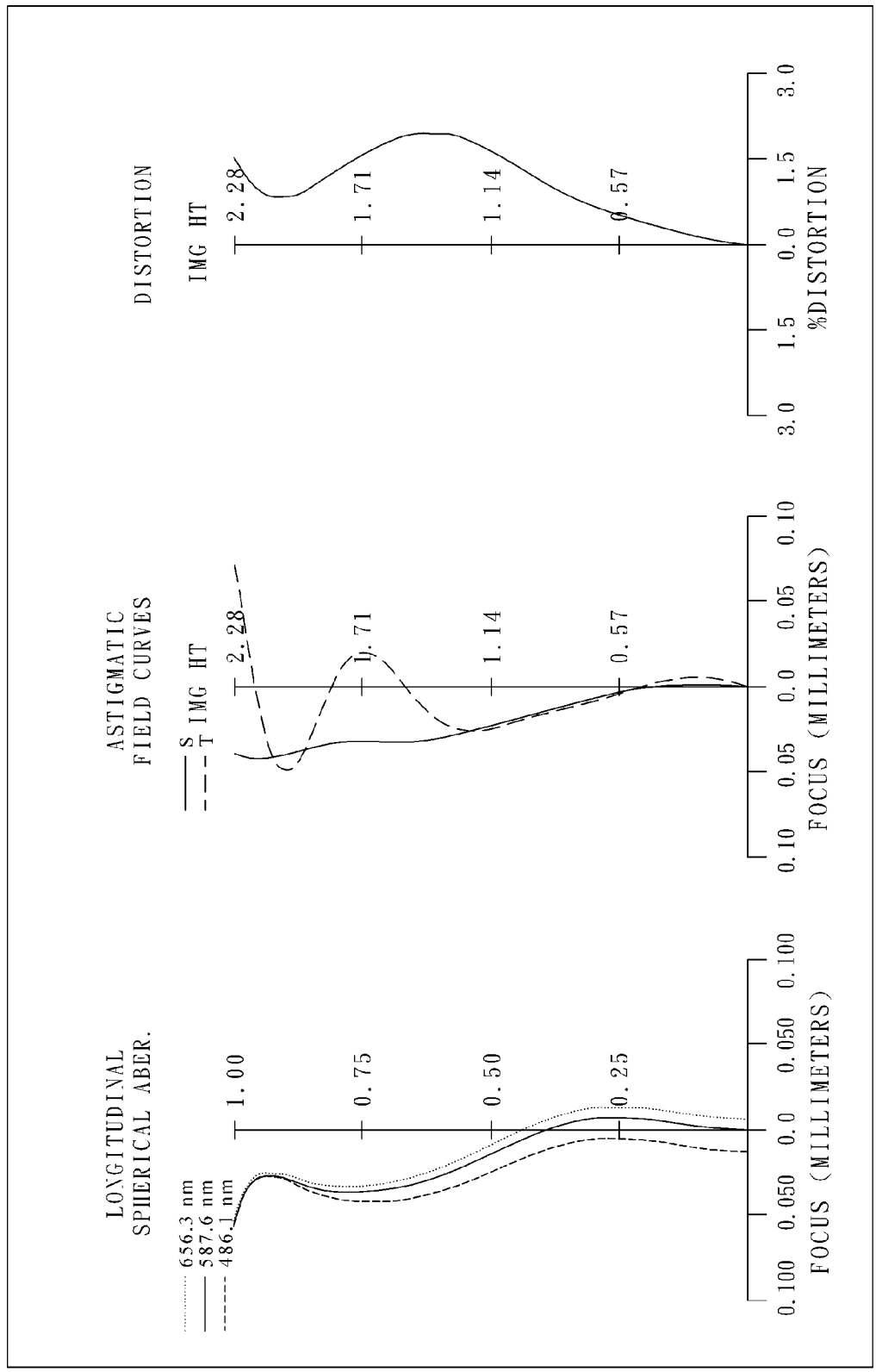
FIG. 6B shows the aberration curves of the sixth embodiment of the present invention.

FIG. 6A shows an image capturing lens system in accordance with the sixth embodiment of the present invention, and FIG. 6B shows the aberration curves of the sixth embodiment of the present invention. The image capturing lens system of the sixth embodiment of the present invention mainly comprises five lens elements, in order from an object side to an image side:

a first lens element 610 made of plastic with positive refractive power having a convex object-side surface 611 and a convex image-side surface 612, the object-side and image-side surfaces 611 and 612 thereof being aspheric;

a second lens element 620 made of plastic with negative refractive power having a concave object-side surface 621 and a convex image-side surface 622, the object-side and image-side surfaces 621 and 622 thereof being aspheric;

a third lens element 630 made of plastic with positive refractive power having a convex object-side surface 631 and a concave image-side surface 632, the object-side and image-side surfaces 631 and 632 thereof being aspheric;

a fourth lens element 640 made of plastic with positive refractive power having a concave object-side surface 641 and a convex image-side surface 642, the object-side and image-side surfaces 641 and 642 thereof being aspheric; and a fifth lens element 650 made of plastic with negative refractive power having a convex object-side surface 651 and a concave image-side surface 652, the object-side and image-side surfaces 651 and 652 thereof being aspheric, and at least one inflection point is formed on the image-side surface 652 thereof;

wherein an aperture stop 600 is disposed between the imaged object and the first lens element 610;

the image capturing lens system further comprises an IR-cut filter 660 disposed between the image-side surface 652 of the fifth lens element 650 and an image plane 670, and the IR-cut filter 660 is made of glass and has no influence on the focal length of the image capturing lens system; the image capturing lens system further comprises an image sensor 680 provided on the image plane 670.

The detailed optical data of the sixth embodiment is shown in TABLE 15, and the aspheric surface data is shown in TABLE 16, wherein the units of the curvature radius, the thickness and the focal length are expressed in mm, and HFOV is half of the maximal field of view.

TABLE 15

(Embodiment 6)
f = 3.08 mm, Fno = 2.18, HFOV = 36.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.120 | | | | |
| 2 | Lens 1 | 1.418 | ASP | 0.531 | Plastic | 1.530 | 55.8 | 2.63 |
| 3 | | −73.673 | ASP | 0.277 | | | | |
| 4 | Lens 2 | −0.948 | ASP | 0.230 | Plastic | 1.632 | 23.4 | −4.00 |
| 5 | | −1.659 | ASP | 0.063 | | | | |
| 6 | Lens 3 | 1.911 | ASP | 0.300 | Plastic | 1.530 | 55.8 | 4.27 |
| 7 | | 11.676 | ASP | 0.417 | | | | |
| 8 | Lens 4 | −1.024 | ASP | 0.473 | Plastic | 1.544 | 55.9 | 3.01 |
| 9 | | −0.733 | ASP | 0.259 | | | | |
| 10 | Lens 5 | 8.821 | ASP | 0.346 | Plastic | 1.530 | 55.8 | −2.29 |
| 11 | | 1.053 | ASP | 0.400 | | | | |
| 12 | IR-cut | Plano | | 0.210 | Glass | 1.517 | 64.2 | — |
| 13 | filter | Plano | | 0.378 | | | | |
| 14 | Image | Plano | | — | | | | |

*Reference wavelength is d-line 587.6 nm

TABLE 16

Aspheric Coefficients

| Surface # | 2 | 3 | 4 | 5 | 6 |
|---|---|---|---|---|---|
| k = | −1.4191E+00 | −1.0000E+00 | −4.6306E+00 | −1.2959E+01 | −1.0395E+01 |
| A4 = | 1.6351E−02 | −1.2330E−01 | 7.1527E−02 | 6.7473E−02 | −1.7620E−01 |
| A6 = | 1.5369E−01 | −3.1264E−01 | 9.9503E−03 | 5.3419E−01 | 3.8818E−01 |
| A8 = | −1.2196E+00 | 4.3118E−01 | −6.4828E−01 | −9.2329E−01 | −1.6547E+00 |
| A10 = | 3.0161E+00 | −1.5284E+00 | 7.7072E−01 | −9.6467E−02 | 4.3197E+00 |
| A12 = | −4.1809E+00 | 2.1755E+00 | 8.2950E−01 | 1.7698E+00 | −7.1276E+00 |
| A14 = | 1.5688E+00 | −1.1870E+00 | −9.1025E−01 | −1.2478E+00 | 4.1160E+00 |

TABLE 16-continued

| Aspheric Coefficients | | | | | |
|---|---|---|---|---|---|
| Surface # | 7 | 8 | 9 | 10 | 11 |
| k = | 9.4365E+00 | −1.2264E+00 | −3.3115E+00 | 2.0068E+01 | −6.8619E+00 |
| A4 = | −1.2074E−01 | 8.4549E−03 | −3.5695E−01 | −1.6325E−01 | −1.6322E−01 |
| A6 = | −3.4773E−01 | −3.9659E−01 | 5.4106E−01 | −9.2973E−04 | 1.2689E−01 |
| A8 = | 1.2395E+00 | 5.0600E−01 | −9.6097E−01 | 9.0174E−02 | −8.3313E−02 |
| A10 = | −1.8817E+00 | 9.4900E−01 | 1.3980E+00 | −8.9432E−02 | 3.2297E−02 |
| A12 = | 9.3734E−01 | −1.4865E+00 | −9.0168E−01 | 3.4995E−02 | −7.1270E−03 |
| A14 = | 4.7318E−02 | 5.2213E−01 | 2.0265E−01 | −4.6687E−03 | 6.8734E−04 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

| (Embodiment 6) | | | |
|---|---|---|---|
| f [mm] | 3.08 | f/R4 | −1.86 |
| Fno | 2.18 | f/R6 | 0.26 |
| HFOV [deg.] | 36.4 | (f/R3) + (f/R4) | −5.11 |
| V2/V1 | 0.42 | (R7 − R8)/(R7 + R8) | 0.17 |
| (T34 + T45)/T12 | 2.44 | f/f4 | 1.02 |
| (R1 + R2)/(R1 − R2) | −0.96 | Td * R4 [mm$^2$] | −4.81 |
| R4/R3 | 1.75 | TTL/ImgH | 1.67 |
| 1/R4 [mm$^{-1}$] | −0.603 | | |

Embodiment 7

Figure 7A:
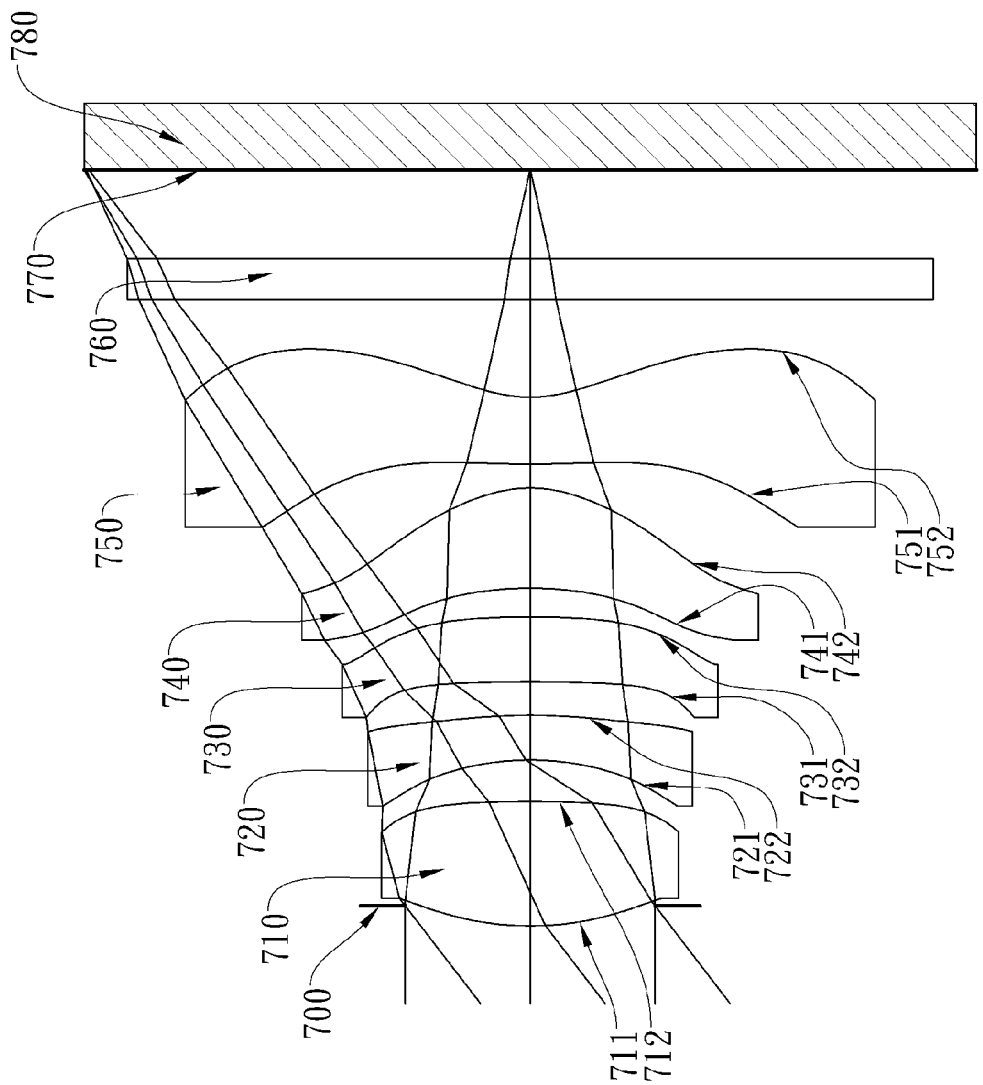
FIG. 7A shows an image capturing lens system in accordance with the seventh embodiment of the present invention.
Figure 7B:
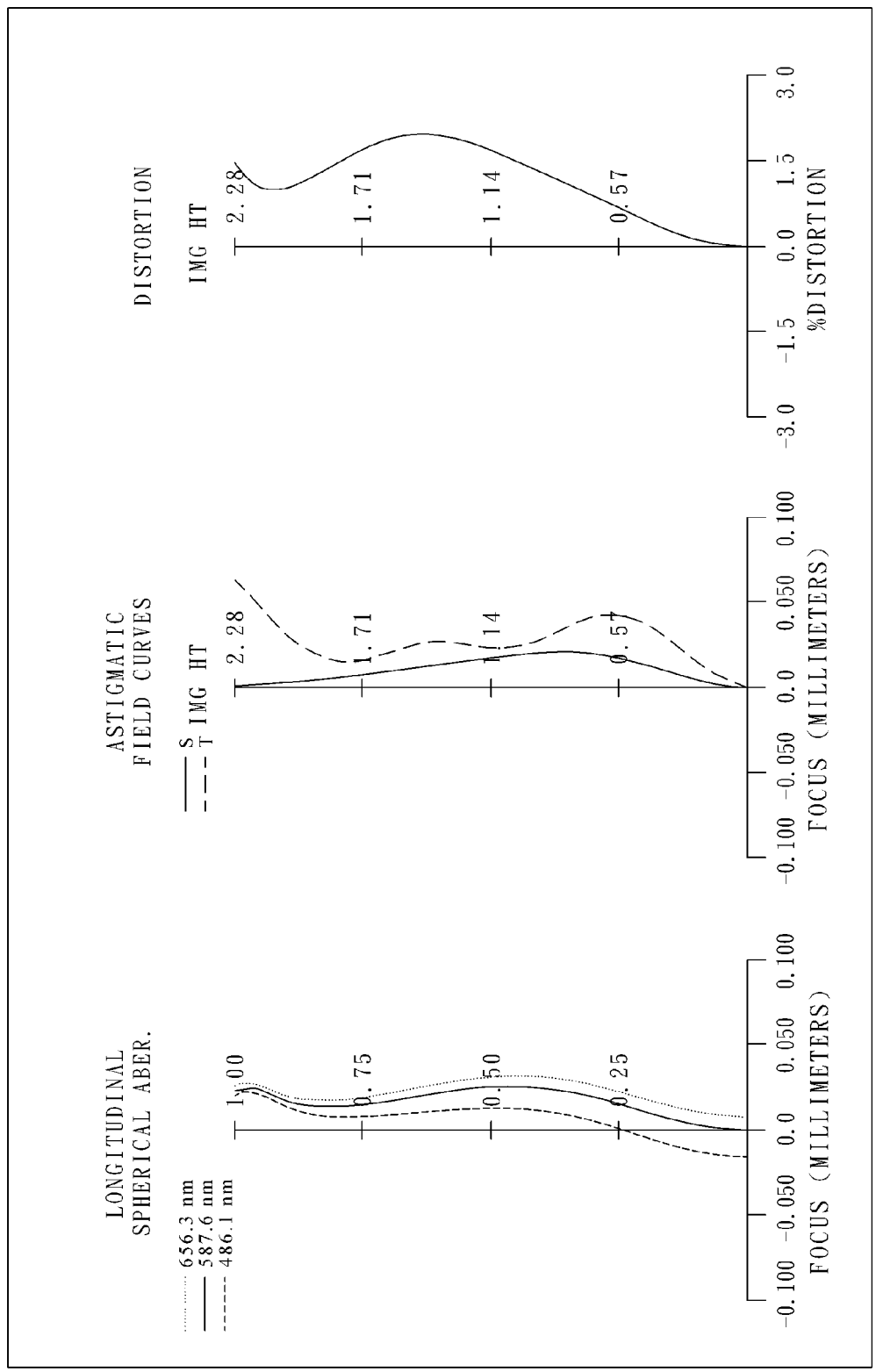
FIG. 7B shows the aberration curves of the seventh embodiment of the present invention.

FIG. 7A shows an image capturing lens system in accordance with the seventh embodiment of the present invention, and FIG. 7B shows the aberration curves of the seventh embodiment of the present invention. The image capturing lens system of the seventh embodiment of the present invention mainly comprises five lens elements, in order from an object side to an image side:

a first lens element 710 made of plastic with positive refractive power having a convex object-side surface 711 and a convex image-side surface 712, the object-side and image-side surfaces 711 and 712 thereof being aspheric;

a second lens element 720 made of plastic with negative refractive power having a concave object-side surface 721 and a convex image-side surface 722, the object-side and image-side surfaces 721 and 722 thereof being aspheric;

a third lens element 730 made of plastic with positive refractive power having a concave object-side surface 731 and a convex image-side surface 732, the object-side and image-side surfaces 731 and 732 thereof being aspheric;

a fourth lens element 740 made of plastic with positive refractive power having a concave object-side surface 741 and a convex image-side surface 742, the object-side and image-side surfaces 741 and 742 thereof being aspheric; and a fifth lens element 750 made of plastic with negative refractive power having a convex object-side surface 751 and a concave image-side surface 752, the object-side and image-side surfaces 751 and 752 thereof being aspheric, and at least one inflection point is formed on the image-side surface 752 thereof;

wherein an aperture stop 700 is disposed between the imaged object and the first lens element 710;

the image capturing lens system further comprises an IR-cut filter 760 disposed between the image-side surface 752 of the fifth lens element 750 and an image plane 770, and the IR-cut filter 760 is made of glass and has no influence on the focal length of the image capturing lens system; the image capturing lens system further comprises an image sensor 780 provided on the image plane 770.

The detailed optical data of the seventh embodiment is shown in TABLE 18, and the aspheric surface data is shown in TABLE 19, wherein the units of the curvature radius, the thickness and the focal length are expressed in mm, and HFOV is half of the maximal field of view.

TABLE 18

| (Embodiment 7) f = 2.92 mm, Fno = 2.28, HFOV = 37.5 deg, | | | | | | | |
|---|---|---|---|---|---|---|---|
| Surface # | | Curvature Radius | | Thickness | Material | Index | Abbe # | Focal length |
| 0 | Object | Plano | | Infinity | | | | |
| 1 | Ape. Stop | Plano | | −0.102 | | | | |
| 2 | Lens 1 | 1.496 | ASP | 0.638 | Plastic | 1.544 | 55.9 | 2.44 |
| 3 | | −10.165 | ASP | 0.213 | | | | |
| 4 | Lens 2 | −1.459 | ASP | 0.230 | Plastic | 1.640 | 23.3 | −5.00 |
| 5 | | −2.849 | ASP | 0.171 | | | | |
| 6 | Lens 3 | −18.182 | ASP | 0.333 | Plastic | 1.544 | 55.9 | 16.10 |
| 7 | | −5.950 | ASP | 0.148 | | | | |
| 8 | Lens 4 | −1.930 | ASP | 0.514 | Plastic | 1.544 | 55.9 | 1.62 |
| 9 | | −0.662 | ASP | 0.122 | | | | |
| 10 | Lens 5 | 4.889 | ASP | 0.343 | Plastic | 1.535 | 56.3 | −1.45 |
| 11 | | 0.653 | ASP | 0.500 | | | | |
| 12 | IR-cut | Plano | | 0.210 | Glass | 1.517 | 64.2 | — |

TABLE 18-continued (Embodiment 7)
f = 2.92 mm, Fno = 2.28, HFOV = 37.5 deg.

| Surface # | | Curvature Radius | Thickness | Material | Index | Abbe # | Focal length |
|---|---|---|---|---|---|---|---|
| 13 | filter | Plano | 0.454 | | | | |
| 14 | Image | Plano | — | | | | |

*Reference wavelength is d-line 587.6 nm

TABLE 19

| Aspheric Coefficients | | | | | |
|---|---|---|---|---|---|
| Surface # | 2 | 3 | 4 | 5 | 6 |
| k = | −1.3333E+00 | −1.0000E+00 | −5.1768E−01 | −5.6222E+01 | −9.0000E+01 |
| A4 = | 1.5671E−02 | −1.8468E−01 | −2.0547E−02 | −7.7578E−02 | −1.5529E−01 |
| A6 = | 8.3816E−02 | −3.1972E−01 | −8.4865E−02 | 4.4681E−01 | 2.5957E−01 |
| A8 = | −8.9932E−01 | 2.2078E−01 | −9.9669E−01 | −6.9518E−01 | −1.6323E+00 |
| A10 = | 2.5999E+00 | −1.3224E+00 | 1.3953E+00 | −3.9790E−01 | 4.2500E+00 |
| A12 = | −4.0854E+00 | 2.1945E+00 | 7.3399E−01 | 1.7484E+00 | −7.1276E+00 |
| A14 = | 1.3267E+00 | −1.1185E+00 | −7.7139E−01 | −1.2317E+00 | 4.1872E+00 |
| Surface # | 7 | 8 | 9 | 10 | 11 |
| k = | 1.8666E+01 | 1.9126E−01 | −3.8675E+00 | −9.0000E+01 | −5.1884E+00 |
| A4 = | −2.2486E−01 | −9.9754E−02 | −3.4289E−01 | −2.2832E−01 | −2.0419E−01 |
| A6 = | −3.8789E−01 | −3.7898E−01 | 5.0819E−01 | 3.1804E−02 | 1.5142E−01 |
| A8 = | 1.3174E+00 | 5.1674E−01 | −9.5457E−01 | 8.9725E−02 | −8.8758E−02 |
| A10 = | −1.7764E+00 | 9.4753E−01 | 1.4062E+00 | −8.8546E−02 | 3.2327E−02 |
| A12 = | 9.1223E−01 | −1.4846E+00 | −9.0104E−01 | 3.4591E−02 | −6.7679E−03 |
| A14 = | 2.4881E−02 | 5.2377E−01 | 2.0137E−01 | −4.7645E−03 | 6.0782E−04 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following

TABLE 20

| (Embodiment 7) | | | |
|---|---|---|---|
| f [mm] | 2.92 | f/R4 | −1.02 |
| Fno | 2.28 | f/R6 | −0.49 |
| HFOV [deg.] | 37.5 | (f/R3) + (f/R4) | −3.02 |
| V2/V1 | 0.42 | (R7 − R8)/(R7 + R8) | 0.49 |
| (T34 + T45)/T12 | 1.27 | f/f4 | 1.80 |
| (R1 + R2)/(R1 − R2) | −0.74 | Td * R4 [mm$^2$] | −7.72 |
| R4/R3 | 1.95 | TTL/ImgH | 1.67 |
| 1/R4 [mm$^{-1}$] | −0.351 | | |

Embodiment 8

Figure 8A:
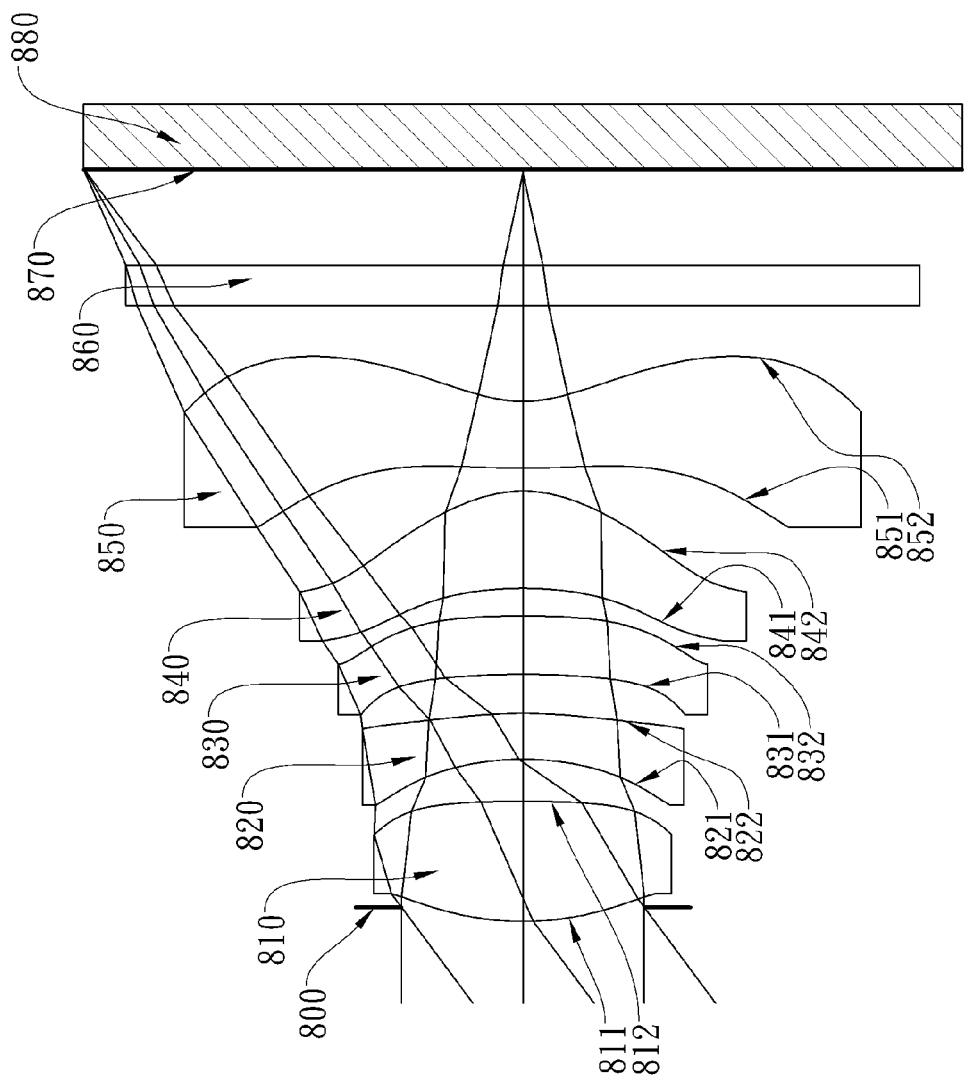
FIG. 8A shows an image capturing lens system in accordance with the eighth embodiment of the present invention.
Figure 8B:
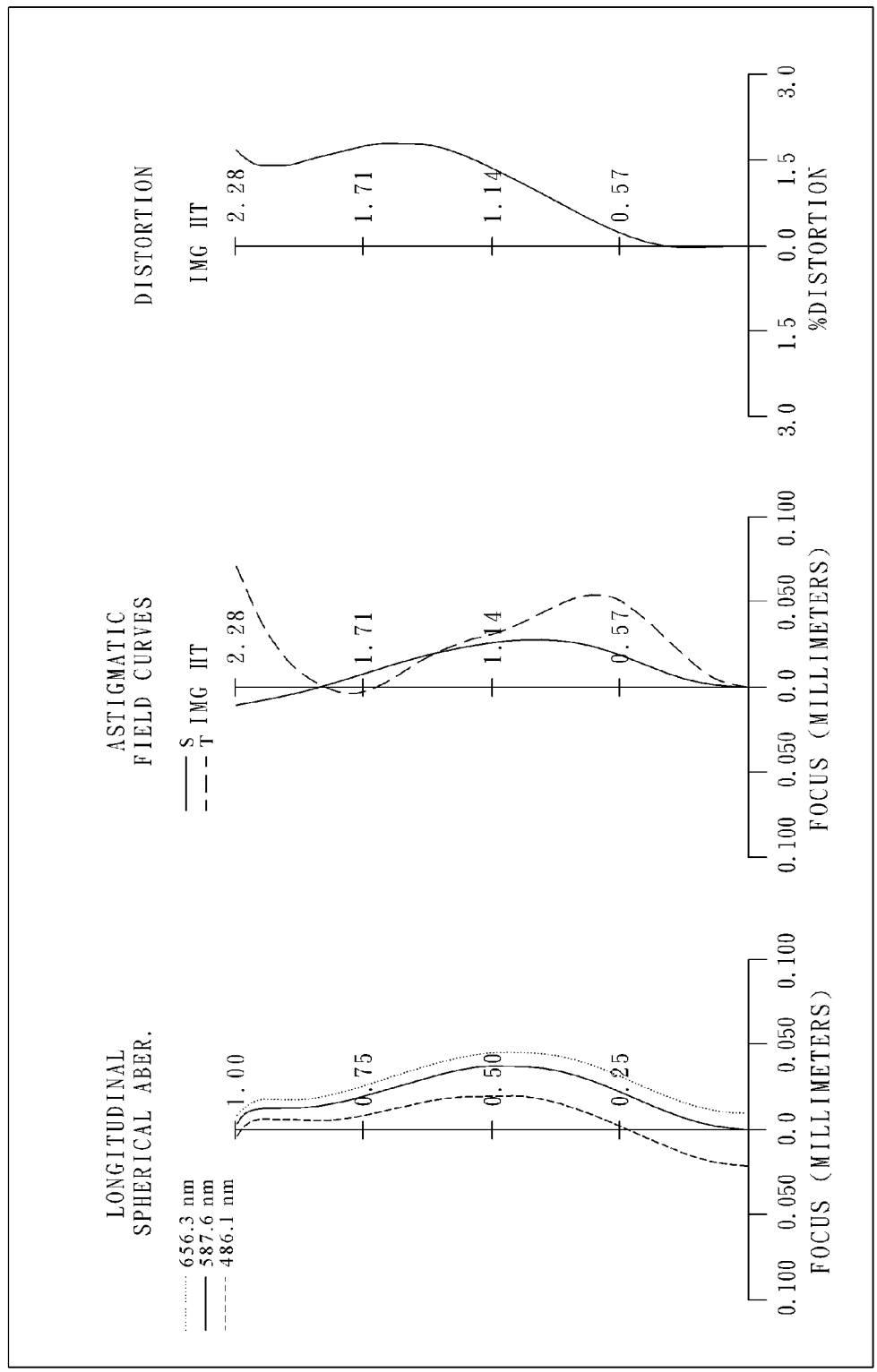
FIG. 8B shows the aberration curves of the eighth embodiment of the present invention.

FIG. 8A shows an image capturing lens system in accordance with the eighth embodiment of the present invention, and FIG. 8B shows the aberration curves of the eighth embodiment of the present invention. The image capturing lens system of the eighth embodiment of the present invention mainly comprises five lens elements, in order from an object side to an image side:

a first lens element 810 made of plastic with positive refractive power having a convex object-side surface 811 and a convex image-side surface 812, the object-side and image-side surfaces 811 and 812 thereof being aspheric;

a second lens element 820 made of plastic with negative refractive power having a concave object-side surface 821 and a convex image-side surface 822, the object-side and image-side surfaces 821 and 822 thereof being aspheric;

a third lens element 830 made of plastic with negative refractive power having a concave object-side surface 831 and a convex image-side surface 832, the object-side and image-side surfaces 831 and 832 thereof being aspheric;

a fourth lens element 840 made of plastic with positive refractive power having a concave object-side surface 841 and a convex image-side surface 842, the object-side and image-side surfaces 841 and 842 thereof being aspheric; and a fifth lens element 850 made of plastic with negative refractive power having a convex object-side surface 851 and a concave image-side surface 852, the object-side and image-side surfaces 851 and 852 thereof being aspheric, and at least one inflection point is formed on the image-side surface 852 thereof;

wherein an aperture stop 800 is disposed between the imaged object and the first lens element 810;

the image capturing lens system further comprises an IR-cut filter 860 disposed between the image-side surface 852 of the fifth lens element 850 and an image plane 870, and the IR-cut filter 860 is made of glass and has no influence on the focal length of the image capturing lens system; the image capturing lens system further comprises an image sensor 880 provided on the image plane 870.

The detailed optical data of the eighth embodiment is shown in TABLE 21, and the aspheric surface data is shown in TABLE 22, wherein the units of the curvature radius, the thickness and the focal length are expressed in mm, and HFOV is half of the maximal field of view.

TABLE 21

(Embodiment 8)
f=3.01 mm, Fno =2.38, HFOV =36.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.073 | | | | |
| 2 | Lens 1 | 1.491 | ASP | 0.625 | Plastic | 1.544 | 55.9 | 2.42 |
| 3 | | −9.607 | ASP | 0.220 | | | | |
| 4 | Lens 2 | −1.474 | ASP | 0.240 | Plastic | 1.634 | 23.8 | −6.59 |
| 5 | | −2.422 | ASP | 0.203 | | | | |
| 6 | Lens 3 | −4.782 | ASP | 0.304 | Plastic | 1.544 | 55.9 | −49.25 |
| 7 | | −5.950 | ASP | 0.145 | | | | |
| 8 | Lens 4 | −1.899 | ASP | 0.508 | Plastic | 1.544 | 55.9 | 1.57 |
| 9 | | −0.645 | ASP | 0.119 | | | | |
| 10 | Lens 5 | 4.746 | ASP | 0.348 | Plastic | 1.535 | 56.3 | −1.45 |
| 11 | | 0.648 | ASP | 0.500 | | | | |
| 12 | IR-cut | Plano | | 0.210 | Glass | 1.517 | 64.2 | — |
| 13 | filter | Plano | | 0.498 | | | | |
| 14 | Image | Plano | | — | | | | |

TABLE 22

Aspheric Coefficients

| Surface # | 2 | 3 | 4 | 5 | 6 |
|---|---|---|---|---|---|
| k = | −1.3290E+00 | −1.0000E+00 | −5.3352E−01 | −4.9724E+01 | −9.0000E+01 |
| A4 = | 1.5649E−02 | −1.8941E−01 | −1.9086E−02 | −7.0752E−02 | −1.5343E−01 |
| A6 = | 7.8899E−02 | −3.2195E−01 | −9.3214E−02 | 4.5719E−01 | 2.4201E−01 |
| A8 = | −9.0832E−01 | 2.1071E−01 | −1.0015E+00 | −6.7495E−01 | −1.6207E+00 |
| A10 = | 2.5494E+00 | −1.3181E+00 | 1.4345E+00 | −4.0657E−01 | 4.3013E+00 |
| A12 = | −4.0862E+00 | 2.1947E+00 | 7.3087E−01 | 1.7531E+00 | −7.1183E+00 |
| A14 = | 1.3265E+00 | −1.1181E+00 | −7.7428E−01 | −1.2295E+00 | 4.1885E+00 |

| Surface # | 7 | 8 | 9 | 10 | 11 |
|---|---|---|---|---|---|
| k = | 1.9191E+01 | 2.4900E−01 | −3.7665E+00 | −5.1183E+01 | −5.4637E+00 |
| A4 = | −2.3866E−01 | −1.0182E−01 | −3.3653E−01 | −2.2899E−01 | −2.0789E−01 |
| A6 = | −3.8921E−01 | −3.7933E−01 | 5.0957E−01 | 3.2536E−02 | 1.5240E−01 |
| A8 = | 1.3195E+00 | 5.1726E−01 | −9.5316E−01 | 8.9629E−02 | −8.8899E−02 |
| A10 = | −1.7734E+00 | 9.4882E−01 | 1.4070E+00 | −8.8480E−02 | 3.2355E−02 |
| A12 = | 9.1418E−01 | −1.4838E+00 | −9.0081E−01 | 3.4609E−02 | −6.7533E−03 |
| A14 = | 2.5497E−02 | 5.2399E−01 | 2.0148E−01 | −4.7918E−03 | 5.9740E−04 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f [mm] | 3.01 | f/R4 | −1.24 |
|---|---|---|---|
| Fno | 2.38 | f/R6 | −0.51 |
| HFOV [deg.] | 36.6 | (f/R3) + (f/R4) | −3.28 |
| V2/V1 | 0.43 | (R7 − R8)/(R7 + R8) | 0.49 |
| (T34 + T45)/T12 | 1.20 | f/f4 | 1.92 |
| (R1 + R2)/(R1 − R2) | −0.73 | Td * R4 [mm$^2$] | −6.57 |
| R4/R3 | 1.64 | TTL/ImgH | 1.68 |
| 1/R4 [mm$^{-1}$] | −0.413 | | |

Embodiment 9

Figure 9A:
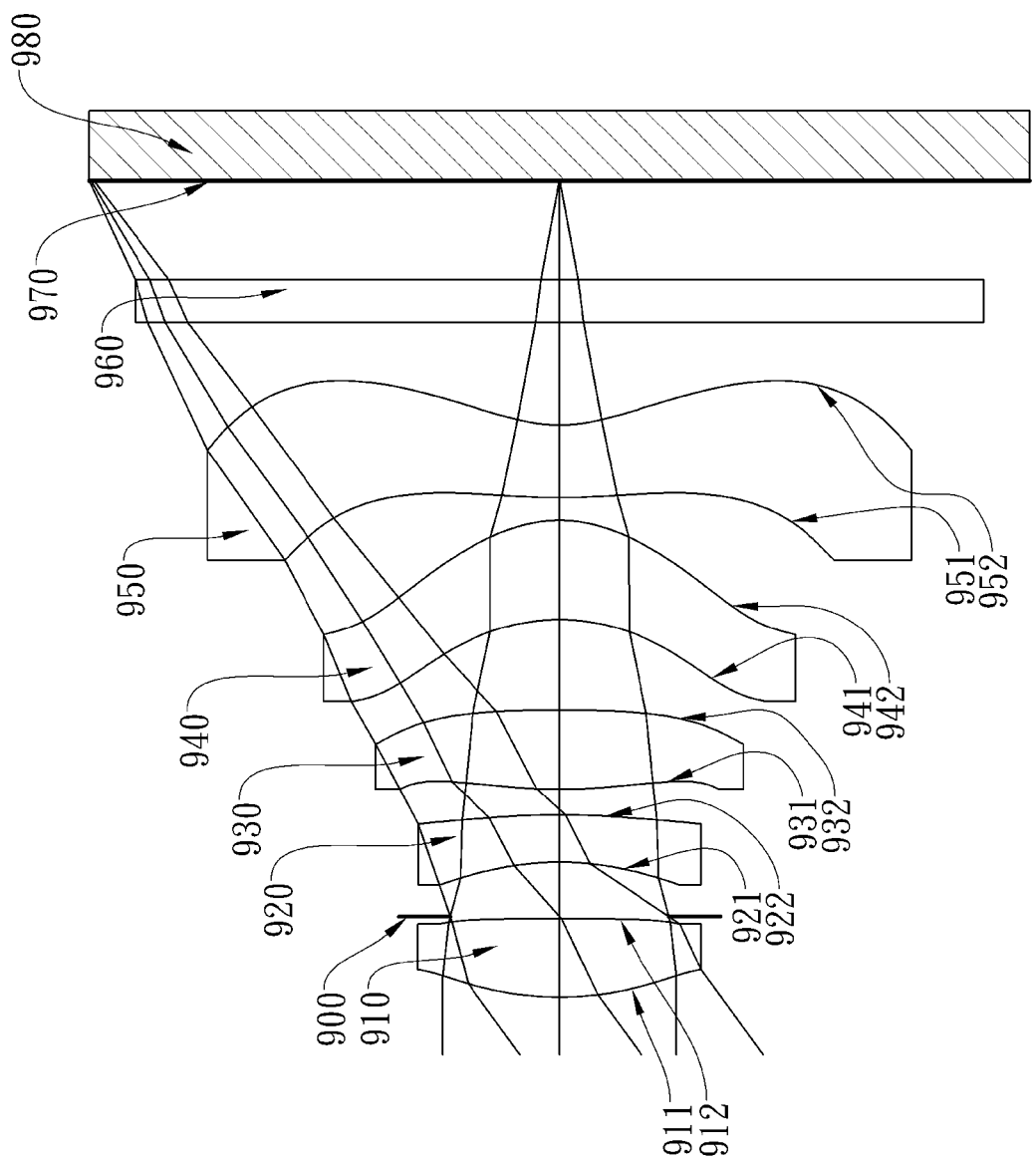
FIG. 9A shows an image capturing lens system in accordance with the ninth embodiment of the present invention.
Figure 9B:
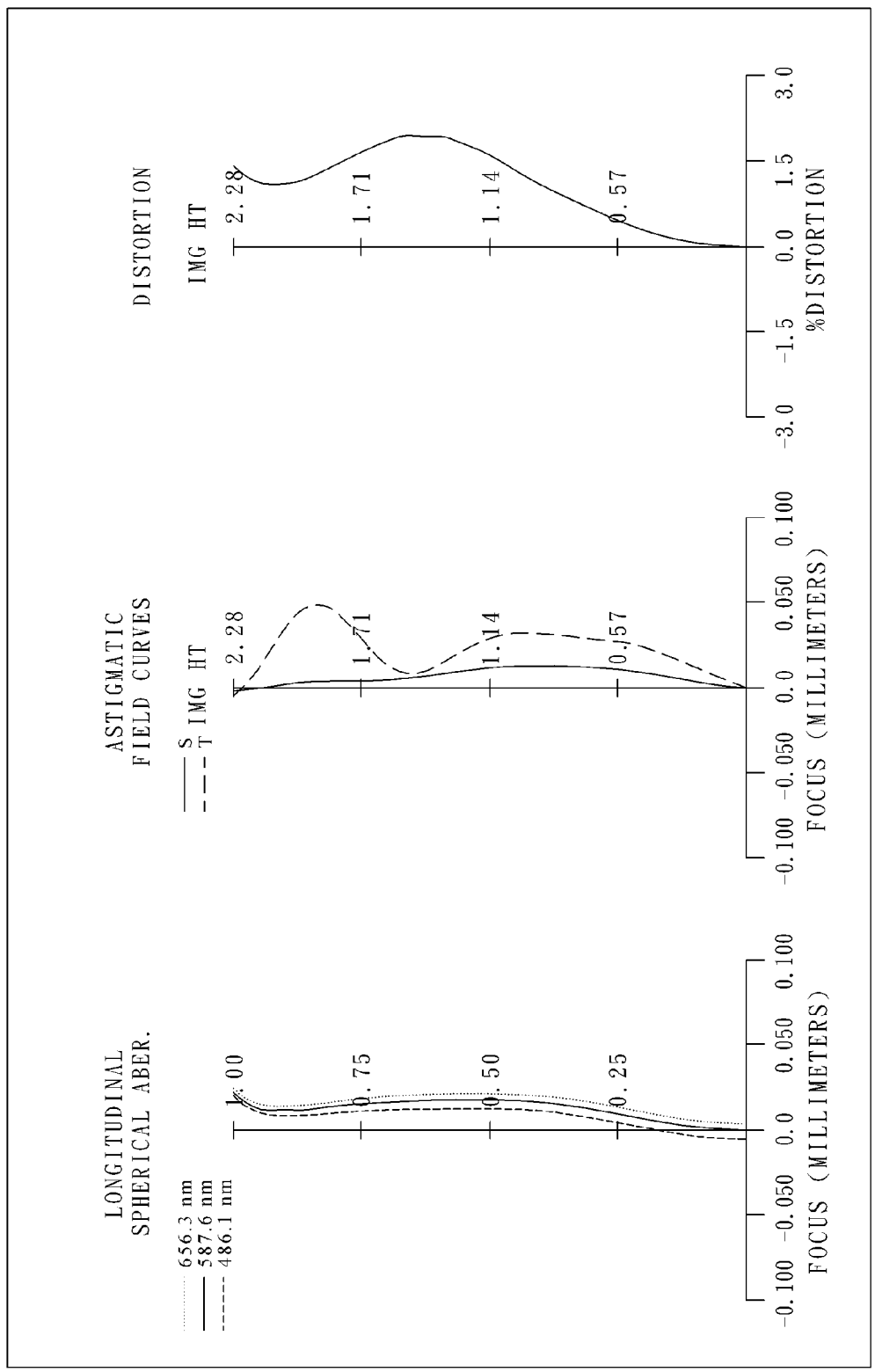
FIG. 9B shows the aberration curves of the ninth embodiment of the present invention.

FIG. 9A shows an image capturing lens system in accordance with the ninth embodiment of the present invention, and FIG. 9B shows the aberration curves of the ninth embodiment of the present invention. The image capturing lens system of the ninth embodiment of the present invention mainly comprises five lens elements, in order from an object side to an image side:

a first lens element 910 made of plastic with positive refractive power having a convex object-side surface 911 and a convex image-side surface 912, the object-side and image-side surfaces 911 and 912 thereof being aspheric;

a second lens element 920 made of plastic with negative refractive power having a concave object-side surface 921 and a convex image-side surface 922, the object-side and image-side surfaces 921 and 922 thereof being aspheric;

a third lens element 930 made of plastic with positive refractive power having a convex object-side surface 931 and a convex image-side surface 932, the object-side and image-side surfaces 931 and 932 thereof being aspheric;

a fourth lens element 940 made of plastic with positive refractive power having a concave object-side surface 941 and a convex image-side surface 942, the object-side and image-side surfaces 941 and 942 thereof being aspheric; and a fifth lens element 950 made of plastic with negative refractive power having a convex object-side surface 951 and a concave image-side surface 952, the object-side and image-side surfaces 951 and 952 thereof being aspheric, and at least one inflection point is formed on the image-side surface 952 thereof;

wherein an aperture stop 900 is disposed between the first lens element 910 and the second lens element 920;

the image capturing lens system further comprises an IR-cut filter 960 disposed between the image-side surface 952 of the fifth lens element 950 and an image plane 970, and the IR-cut filter 960 is made of glass and has no influence on the focal length of the image capturing lens system; the image capturing lens system further comprises an image sensor 980 provided on the image plane 970.

The detailed optical data of the ninth embodiment is shown in TABLE 24, and the aspheric surface data is shown in TABLE 25, wherein the units of the curvature radius, the thickness and the focal length are expressed in mm, and HFOV is half of the maximal field of view.

TABLE 24

(Embodiment 9)
f = 3.08 mm, Fno = 2.70, HFOV = 36.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.491 | ASP | 0.383 | Plastic | 1.544 | 55.9 | 2.72 |
| 2 | | −164.627 | ASP | 0.011 | | | | |
| 3 | Ape. Stop | Plano | | 0.265 | | | | |
| 4 | Lens 2 | −1.346 | ASP | 0.230 | Plastic | 1.640 | 23.3 | −3.46 |
| 5 | | −3.655 | ASP | 0.126 | | | | |
| 6 | Lens 3 | 2.409 | ASP | 0.385 | Plastic | 1.544 | 55.9 | 3.51 |
| 7 | | −8.681 | ASP | 0.442 | | | | |
| 8 | Lens 4 | −0.970 | ASP | 0.484 | Plastic | 1.544 | 55.9 | 2.26 |
| 9 | | −0.638 | ASP | 0.110 | | | | |
| 10 | Lens 5 | 2.897 | ASP | 0.355 | Plastic | 1.535 | 56.3 | −1.85 |
| 11 | | 0.705 | ASP | 0.500 | | | | |
| 12 | IR-cut | Plano | | 0.210 | Glass | 1.517 | 64.2 | — |
| 13 | filter | Plano | | 0.481 | | | | |
| 14 | Image | Plano | | | | | | |

*Reference wavelength is d-line 587.6 nm

TABLE 25

Aspheric Coefficients

| Surface # | 1 | 2 | 4 | 5 | 6 |
|---|---|---|---|---|---|
| k = | −1.5005E+00 | −1.0000E+00 | −3.8983E+00 | −5.0857E+01 | −1.6413E+01 |
| A4 = | 1.2701E−02 | −1.0674E−01 | 1.0297E−01 | −3.1239E−02 | −2.1799E−01 |
| A6 = | 6.9309E−02 | −1.7677E−01 | −2.1242E−01 | 4.6736E−01 | 4.6252E−01 |
| A8 = | −1.0526E+00 | −7.6101E−02 | −2.5461E−01 | −9.6441E−01 | −1.8645E+00 |
| A10 = | 2.7912E+00 | −1.2303E+00 | 2.1974E−01 | −1.7127E−01 | 4.3707E+00 |
| A12 = | −4.6359E+00 | 2.1962E+00 | 7.3129E−01 | 1.8010E+00 | −7.1180E+00 |
| A14 = | 1.3257E+00 | −1.1185E+00 | −7.7133E−01 | −1.2314E+00 | 4.2392E+00 |

| Surface # | 7 | 8 | 9 | 10 | 11 |
|---|---|---|---|---|---|
| k = | 8.3826E−01 | −9.8010E−01 | −3.2480E+00 | −8.3516E+01 | −6.3913E+00 |
| A4 = | −1.1984E−01 | 4.9582E−03 | −3.6657E−01 | −1.3016E−01 | −1.7438E−01 |
| A6 = | −4.0818E−01 | −3.9789E−01 | 5.5985E−01 | −3.3906E−02 | 1.2674E−01 |
| A8 = | 1.2268E+00 | 5.1557E−01 | −9.6124E−01 | 9.2476E−02 | −8.3401E−02 |
| A10 = | −1.8234E+00 | 9.5317E−01 | 1.3933E+00 | −8.5276E−02 | 3.2474E−02 |
| A12 = | 9.4352E−01 | −1.4796E+00 | −9.0287E−01 | 3.1006E−02 | −7.1783E−03 |
| A14 = | 7.8441E−02 | 5.2413E−01 | 2.0595E−01 | −3.5616E−03 | 6.7411E−04 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

(Embodiment 9)

| f [mm] | 3.08 | f/R4 | −0.84 |
|---|---|---|---|
| Fno | 2.70 | f/R6 | −0.35 |
| HFOV [deg.] | 36.1 | (f/R3) + (f/R4) | −3.13 |
| V2/V1 | 0.42 | (R7 − R8)/(R7 + R8) | 0.21 |
| (T34 + T45)/T12 | 2.00 | f/f4 | 1.36 |
| (R1 + R2)/(R1 − R2) | −0.98 | Td * R4 [mm$^2$] | −10.21 |
| R4/R3 | 2.72 | TTL/ImgH | 1.71 |
| 1/R4 [mm$^{-1}$] | −0.274 | | |

It is to be noted that TABLES 1-26 show different data of the different embodiments; however, the data of the different embodiments are obtained from experiments. Therefore, any image capturing lens system of the same structure is considered to be within the scope of the present invention even if it uses different data. The embodiments depicted above and the appended drawings are exemplary and are not intended to limit the scope of the present invention.

What is claimed is:

1. An image capturing lens system comprising, in order from an object side to an image side:
   a first lens element with positive refractive power having a convex object-side surface;
   a second lens element with negative refractive power having a concave object-side surface and a convex image-side surface;
   a third lens element with refractive power;
   a fourth lens element with positive refractive power having a convex image-side surface, and both of the object-side and image-side surfaces thereof being aspheric; and
   a fifth lens element with refractive power having a concave image-side surface, both of the object-side and image-side surfaces thereof being aspheric, and at least one inflection point being formed on the image-side surface thereof;
   wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, an axial distance between the third lens element and the fourth lens element is T34, an axial distance between the fourth lens element and the fifth lens element is T45, an axial distance between the first lens element and the second lens element is T12, and they satisfy the following relations:

$-3.0<f/R4<-0.70;$ $0.40<f/f4<2.20;$ $-2.5<(R1+R2)/(R1-R2)<-0.4;$ and $0.75<(T34+T45)/T12<2.95.$ 2. The image capturing lens system according to claim 1, wherein the fifth lens element has negative refractive power.

3. The image capturing lens system according to claim 2, wherein the fourth lens element has a concave object-side surface.

4. The image capturing lens system according to claim 3, wherein the curvature radius of the image-side surface of the second lens element is R4, a curvature radius of the object-side surface of the second lens element is R3, and they satisfy the following relation:

$1.15<R4/R3<3.0.$

5. The image capturing lens system according to claim 4, wherein an Abbe number of the second lens element is V2, an Abbe number of the first lens element is V1, and they satisfy the following relation:

$0.3<V2/V1<0.5.$

6. The image capturing lens system according to claim 4, wherein the focal length of the image capturing lens system is f, the curvature radius of the image-side surface of the second lens element is R4, and they satisfy the following relation:

$-2.5<f/R4<-1.0.$

7. The image capturing lens system according to claim 4, wherein the third lens element has positive refractive power.

8. The image capturing lens system according to claim 3, wherein the focal length of the image capturing lens system is f, a curvature radius of the object-side surface of the second lens element is R3, the curvature radius of the image-side surface of the second lens element is R4, and they satisfy the following relation:

$-8<(f/R3)+(f/R4)<-3.$

9. The image capturing lens system according to claim 3, wherein the focal length of the image capturing lens system is f, a curvature radius of the image-side surface of the third lens element is R6, and they satisfy the following relation:

$-2.0<f/R6<1.0.$

10. The image capturing lens system according to claim 9, wherein a curvature radius of the object-side surface of the fourth lens element is R7, a curvature radius of the image-side surface of the fourth lens element is R8, and they satisfy the following relation:

$0<(R7-R8)/(R7+R8)<0.6.$

11. The image capturing lens system according to claim 9, wherein an intersection point between a projected tangent line of the maximum effective diameter position on the object-side surface of the fourth lens element and the optical axis is closer to the object side than the on-axis vertex of the object-side surface of the fourth lens element.

12. The image capturing lens system according to claim 9, wherein the curvature radius of the image-side surface of the second lens element is R4, and they satisfy the following relation:

$-2.0 \text{ mm}^{-1}<1/R4<-0.3 \text{ mm}^{-1}.$

13. The image capturing lens system according to claim 3, wherein an axial distance between an object-side surface of the first lens element and the image-side surface of the fifth lens element is TD, the curvature radius of the image-side surface of the second lens element is R4, and they satisfy the following relation:

$-8.0 \text{ mm}^2<TD*R4<-2.0 \text{ mm}^2.$

14. An image capturing lens device with Extended Depth of Field (EDOF) comprising:
   a digital processing unit with Extended Depth of Field functionality; and
   an image capturing lens system comprising, in order from an object side to an image side:
   a first lens element with positive refractive power having a convex object-side surface;
   a second lens element with negative refractive power having a concave object-side surface and a convex image-side surface;
   a third lens element with refractive power;
   a fourth lens element with positive refractive power having a concave object-side surface and a convex image-side surface, and both of the object-side and image-side surfaces thereof being aspheric; and
   a fifth lens element with negative refractive power having a concave image-side surface, both of the object-side and image-side surfaces thereof being aspheric, and at least one inflection point being formed on the image-side surface thereof;
   wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, an axial distance between the third lens element and the fourth lens element is T34, an axial distance between the fourth lens element and the fifth lens element is T45, an axial distance between the first lens element and the second lens element is T12, and they satisfy the following relations:

$-3.0 < f/R4 < -0.70;$ $0.40 < f/f4 < 2.20;$ $-2.5 < (R1+R2)/(R1-R2) < -0.4;$ and $0.75 < (T34+T45)/T12 < 2.95.$ 15. An image capturing lens system comprising, in order from an object side to an image side:
   a first lens element with positive refractive power having a convex object-side surface;
   a second lens element with negative refractive power having a concave object-side surface and a convex image-side surface;
   a third lens element with refractive power having a convex image-side surface;
   a fourth lens element with positive refractive power having a concave object-side surface and a convex image-side surface, and both of the object-side and image-side surfaces thereof being aspheric; and
   a fifth lens element with negative refractive power having a concave image-side surface, both of the object-side and image-side surfaces thereof being aspheric, and at least one inflection point being formed on the image-side surface thereof;
   wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, and they satisfy the following relations:

$-3.0 < f/R4 < -0.70;$ $0.20 < f/f4 < 3.0;$ and $-2.5 < (R1+R2)/(R1-R2) < -0.4.$ 16. The image capturing lens system according to claim 15, wherein the focal length of the image capturing lens system is f, the curvature radius of the image-side surface of the second lens element is R4, and they satisfy the following relation:

$-2.5 < f/R4 < -1.0.$

17. The image capturing lens system according to claim 16, wherein an Abbe number of the second lens element is V2, an Abbe number of the first lens element is V1, and they satisfy the following relation:

$0.3 < V2/V1 < 0.5.$

18. The image capturing lens system according to claim 16, wherein an axial distance between an object-side surface of the first lens element and the image-side surface of the fifth lens element is TD, the curvature radius of the image-side surface of the second lens element is R4, and they satisfy the following relation:

$-8.0 \text{ mm}^2 < TD*R4 < -2.0 \text{ mm}^2.$

19. The image capturing lens system according to claim 16, wherein an intersection point between a projected tangent line of the maximum effective diameter position on the object-side surface of the fourth lens element and the optical axis is closer to the object side than the on-axis vertex of the object-side surface of the fourth lens element.

20. The image capturing lens system according to claim 15, wherein the third lens element has positive refractive power.

21. The image capturing lens system according to claim 20, wherein an axial distance between the third lens element and the fourth lens element is T34, an axial distance between the fourth lens element and the fifth lens element is T45, an axial distance between the first lens element and the second lens element is T12, and they satisfy the following relation:

$0.75 < (T34+T45)/T12 < 2.95.$

22. The image capturing lens system according to claim 20, wherein an axial distance between the object-side surface of the first lens element and the image plane is TTL, a maximum image height of the image capturing lens system is ImgH, and they satisfy the following relation:

$TTL/ImgH < 1.80.$

23. An image capturing lens device with Extended Depth of Field (EDOF) comprising:
    a digital processing unit with Extended Depth of Field functionality; and
    an image capturing lens system comprising, in order from an object side to an image side:
    a first lens element with positive refractive power having a convex object-side surface;
    a second lens element with negative refractive power having a concave object-side surface and a convex image-side surface;
    a third lens element with refractive power having a convex image-side surface;
    a fourth lens element with positive refractive power having a concave object-side surface and a convex image-side surface, both of the object-side and image-side surfaces thereof being aspheric; and a fifth lens element with negative refractive power having a concave image-side surface, both of the object-side and image-side surfaces thereof being aspheric, and at least one inflection point being formed on the image-side surface thereof;

wherein a focal length of the image capturing lens system is f, a curvature radius of the image-side surface of the second lens element is R4, a focal length of the fourth lens element is f4, a curvature radius of the object-side surface of the first lens element is R1, a curvature radius of the image-side surface of the first lens element is R2, and they satisfy the following relations:

$-3.0 < f/R4 < -0.70;$ $0.20 < f/f4 < 3.0;$ and $-2.5 < (R1+R2)/(R1-R2) < -0.4.$

24. The image capturing lens system according to claim 23, wherein the curvature radius of the image-side surface of the second lens element is R4, a curvature radius of the object-side surface of the second lens element is R3, and they satisfy the following relation:

$1.15 < R4/R3 < 3.0.$

25. The image capturing lens system according to claim 23, wherein the focal length of the image capturing lens system is f, a curvature radius of the object-side surface of the second lens element is R3, the curvature radius of the image-side surface of the second lens element is R4, and they satisfy the following relation:

$-8 < (f/R3)+(f/R4) < -3.$

* * * * *